(12) United States Patent
Swenson et al.

(10) Patent No.: US 7,304,996 B1
(45) Date of Patent: Dec. 4, 2007

(54) SYSTEM AND METHOD FOR ASSEMBLING A DATA PACKET

(75) Inventors: Erik R. Swenson, San Jose, CA (US); Christopher J. Young, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 793 days.

(21) Appl. No.: 10/813,731

(22) Filed: Mar. 30, 2004

(51) Int. Cl.
*H04L 12/50* (2006.01)
*H04L 12/56* (2006.01)

(52) U.S. Cl. .................. 370/394; 370/229; 370/230; 370/230.1; 370/231; 370/235; 370/465; 370/474; 370/476; 370/471; 370/470; 709/232; 709/234; 709/236

(58) Field of Classification Search ............ None
See application file for complete search history.

(56) References Cited

U.S. PATENT DOCUMENTS

| | | | |
|---|---|---|---|
| 6,034,957 A | 3/2000 | Haddock et al. | |
| 6,295,299 B1 | 9/2001 | Haddock et al. | |
| 6,381,242 B1 | 4/2002 | Maher, III et al. | |
| 6,781,992 B1* | 8/2004 | Rana et al. ............ | 370/394 |
| 6,795,435 B1* | 9/2004 | Jouppi et al. .......... | 370/394 |
| 6,914,905 B1 | 7/2005 | Yip | |
| 6,917,617 B2 | 7/2005 | Jin et al. | |
| 6,957,258 B2 | 10/2005 | Maher, III et al. | |
| 2002/0095512 A1* | 7/2002 | Rana et al. ............ | 709/232 |
| 2003/0193949 A1 | 10/2003 | Kojima et al. | |
| 2004/0003110 A1 | 1/2004 | Ozguner | |
| 2004/0246981 A1 | 12/2004 | Zhiqun | |
| 2005/0074009 A1 | 4/2005 | Kanetake | |

FOREIGN PATENT DOCUMENTS

WO    WO 03/081857    10/2003

OTHER PUBLICATIONS

Van Ess, D., *A Circular FIFO, PSoC Style*, Cypress Microsystems, Application Note AN2036, Rev. B, pp. 1-5, Jun. 21, 2002.
Network Working Group, *RFC 1071—Computing the Internet Checksum*, Sep. 1988, available at: http://www.faqs.org/rfcs/rfc1071.html.

(Continued)

*Primary Examiner*—Raj K Jain
(74) *Attorney, Agent, or Firm*—Howrey LLP

(57) ABSTRACT

Disclosed is a system and method for assembling a data packet. The system can be implemented as four memory elements associated with one or more processors. The first memory element stores a sequence number and a sub-channel identifier for an incoming data packet. The second memory element stores a revised packet fragment. The third memory element stores an unrevised packet fragment. The fourth memory element stores a starting address. In the system, the starting address may be the starting address of the revised packet fragment or the unrevised packet fragment wherein the first memory element identifies portions of the fourth memory element associated with the sequence number. The one or more processors are configured to create a modified data packet by combining the unrevised packet fragments and the revised packet fragment, wherein the modified data packet is associated with the sequence number and sub-channel identifier.

18 Claims, 16 Drawing Sheets

OTHER PUBLICATIONS

Network Working Group, *RFC 1141—Incremental Updating of the Internet Checksum*, Jan. 1990, *available at:* http://www.faqs.org/rfcs/rfc1141.html.

Network Working Group, *RFC 1624—Computation of the Internet Checksum via Incremental Update*, May 1994, *available at:* http://www.faqs.org/rfcs/rfc1624.html.

Netlogic Microsystems, Product Brief NSE5000GLQ, Copyright 2004, *available at:* http://www.netlogicmicro.com/datasheets/nse5000glq.html.

Zhang, Z., *Recovery of Memory and Process in DSM Systems: HA Issue #1*, Hewlett-Packard Co. HPL-2001-76, Mar. 30, 2001.

* cited by examiner

| BIT | FUNCTION | DESCRIPTION |
|---|---|---|
| 15-0 | PTI | PORT TAG INDEX. |
| 19-16 | EQoS | EGRESS QUEUE SELECT. |
| 23-20 | LAI | LINK AGGREGATION INDEX. |
| 24 | JUMBO | EGRESS JUMBO CHECK FLAG. REQUESTS OT PERFORMS JUMBO CHECK ON EGRESS PORT. |
| 25 | DON'T FRAG | DON'T FRAGMENT FLAG. |
| 26 | IF TYPE | INGRESS INTERFACE TYPE. 0 = ETHERNET, 1 = POS INTERFACE. |
| 27 | - | RESERVED. |
| 28 | ROUTE | ROUTE FLAG. ESSENTIALLY DISABLES ECHO KILL IN DISTRIBUTOR 106. |
| 29 | RED | RANDOM EARLY DROP. PACKET MUST BE PROCESSED BY DISTRIBUTOR 106 FOR DROP PRECEDENCE. |
| 31-30 | CTL | AFH FORMAT TYPE. SET TO 0 FOR PACKET ADDRESSOR 112 FORMAT TYPE |
| 51-32 | TXMI | TRANSMIT MODIFICATION INDEX. |
| 58-52 | CQoS | CPU QUEUE SELECT. |
| 59 | CPU COPY | CPU COPY FLAG. REQUESTS OT TO SEND A COPY OF THE PACKET TO THE CPU. |
| 60 | REDIRECT | REDIRECT FLAG. REQUESTS OT TO SEND A COPY OF THE PACKET TO THE CPU FOR REDIRECT PROCESSING. |
| 61 | SSAMPLE | STATISTICAL SAMPLE FLAG. INDICATES TO THE OT THAT PACKET IS A CANDIDATE FOR STATISTICAL SAMPLING AND MUST BE PLACED ON THE MULTICAST QUEUE. |
| 62 | LEARN | LEARN FLAG. REQUESTS OT TO SEND A COPY OF THE PACKET TO THE CPU FOR LEARN PROCESSING. |
| 63 | EMIRROR | EGRESS MIRROR. REQUESTS OT TO SEND A COPY OF THE PACKET TO THE EGRESS MIRROR PORT. |
| 75-64 | IQoS | INGRESS QUEUE SELECT. |
| 78-76 | EMRK SEL | EGRESS MARK SELECT. SELECTS ONE OF 8 EGRESS MARK OPERATIONS. |
| 81-79 | EMRK MASK | EGRESS MARK MASK. SELECTS ONE OF 8 EGRESS MARK MASKS. |
| 82 | IMIRROR | INGRESS MIRROR. REQUESTS OT TO SEND A COPY OF THE PACKET TO THE INGRESS MIRROR PORT. |
| 83 | PERR KILL | PARITY ERROR KILL. REQUESTS RX EGRESS PBUS INTERFACE TO KILL THE PACKET DUE TO THE DETECTION OF AN ARAM PARITY ERROR. |

FIGURE 5

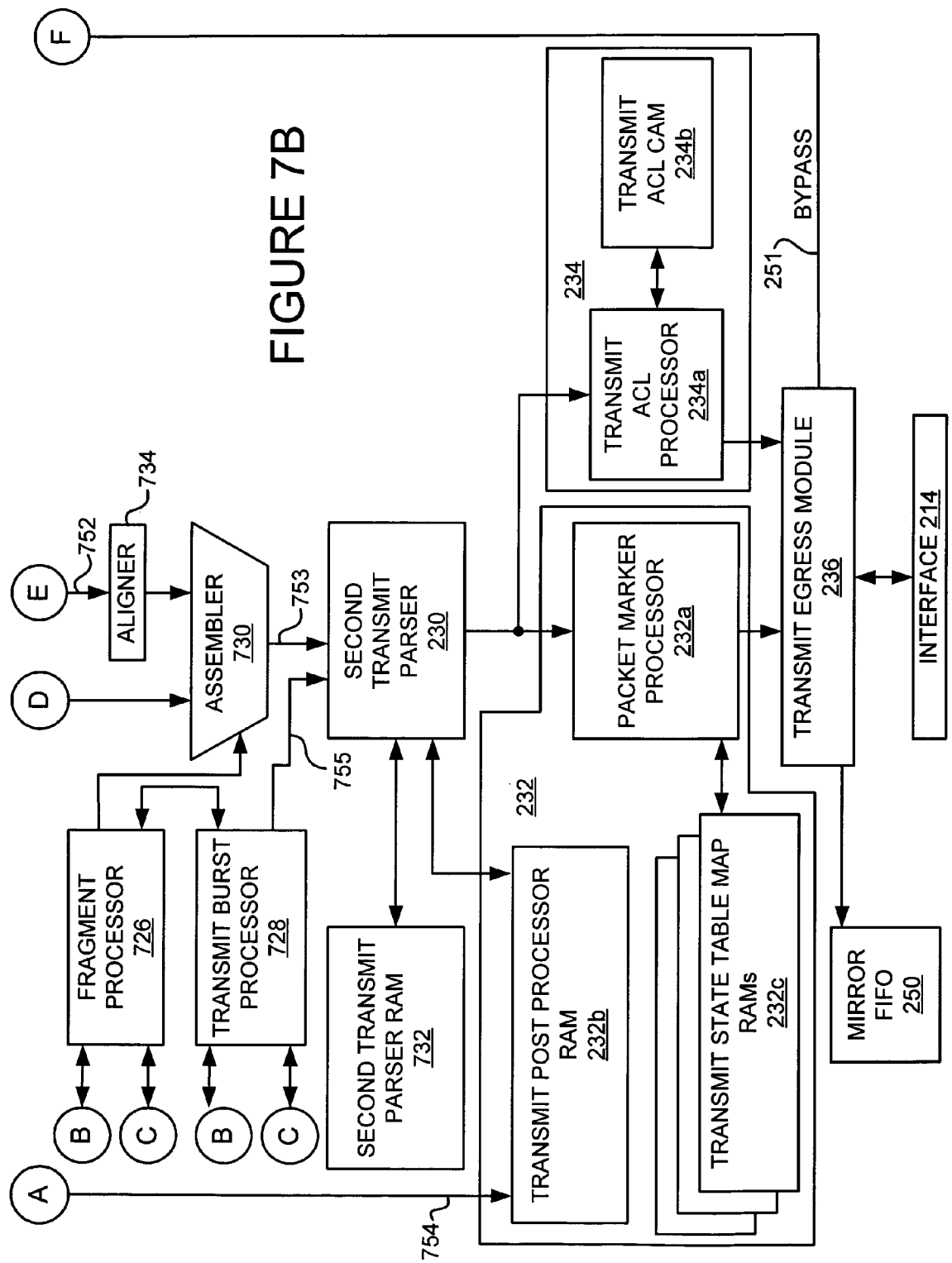

SYSTEM AND METHOD FOR ASSEMBLING A DATA PACKET

RELATED APPLICATIONS

The following applications are commonly owned by the assignee hereof, are being filed on even date herewith, and are each incorporated by reference herein as though set forth in full:

| Howrey Dkt. No. | Extreme Dkt. No. | Title |
|---|---|---|
| application Ser. No. 10/814,725 02453.0025.NPUS00 | P111 | PACKET PROCESSING SYSTEM ARCHITECTURE AND METHOD |
| application Ser. No. 10/814,552 02453.0025.NPUS01 | P153 | PACKET PROCESSING SYSTEM ARCHITECTURE AND METHOD |
| application Ser. No. 10/814,556 02453.0026.NPUS00 | P122 | PACKET DATA MODIFICATION PROCESSOR |
| application Ser. No. 10/814,728 02453.0027.NPUS00 | P124 | SYSTEM AND METHOD FOR PACKET PROCESSOR STATUS MONITORING |
| application Ser. No. 10/814,545 02453.0028.NPUS00 | P126 | METHOD AND SYSTEM FOR INCREMENTALLY UPDATING A CHECKSUM IN A NETWORK DATA PACKET |
| application Ser. No. 10/814,729 02453.0029.NPUS00 | P127 | SYSTEM AND METHOD FOR EGRESS PACKET MARKING |
| application Ser. No. 10/814,727 02453.0032.NPUS00 | P125 | PACKET DATA MODIFICATION PROCESSOR COMMAND INSTRUCTION SET |
| application Ser. No. 10/814,774 02453.0033.NPUS00 | P123 | DATA STRUCTURES FOR SUPPORTING PACKET DATA MODIFICATION OPERATIONS |
| application Ser. No. 60/558,039 02453.0043.PZUS00 | P156 | RECEIVE-SIDE PACKET PROCESSING SYSTEM |

FIELD OF THE INVENTION

This invention relates to the field of computer networking, and more specifically, a system and method for assembling a data packet.

RELATED ART

Current packet processing architectures are under increasing pressure to handle higher and higher data throughputs of, e.g., 10 GB/s or more, and more complex and diverse data packet formats, e.g., embedded packet formats. However, these architectures are subject to various bottlenecks and constraints which limit the achievable data throughput and the packet formats which can be handled with these architectures. Hence, there is a need for a packet processing architecture that overcomes the problems of the prior art.

SUMMARY OF THE INVENTION

The present invention provides a system and method for assembling a data packet. In general terms, the system can be implemented four memory elements associated with one or more processors. The first memory element stores a sequence number and a sub-channel identifier for an incoming data packet. The second memory element stores a revised packet fragment. The third memory element stores an unrevised packet fragment. The fourth memory element stores a starting address. In the system the starting address may be the starting address of the revised packet fragment or the unrevised packet fragment wherein the first memory element identifies portions of the fourth memory element associated with the sequence number. The one or more processors are configured to create a modified data packet by combining the unrevised packet fragments and the revised packet fragment, wherein the modified data packet is associated with the sequence number and sub-channel identifier.

Related methods are also provided. Other systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

The invention can be better understood with reference to the following drawings. The components in the figures are not necessarily to scale, emphasis instead being placed upon clearly illustrating the principles of the invention. In the figures, like reference numerals designate corresponding parts throughout the different views.

FIG. 2 shows that the packet addressor of FIG. 1 includes receive components and transmit components.

FIG. 5 illustrates the format of classification data for a packet as produced by one embodiment of the packet addressor of FIG. 1.

FIGS. 7A and 7B show a block diagram of one embodiment of some of the transmit components of the packet processor of FIG. 1.

FIG. 15 shows some of the components of FIGS. 7A and 7B and some data flows between those components.

DETAILED DESCRIPTION

I. Invention Environment

Figure 1:
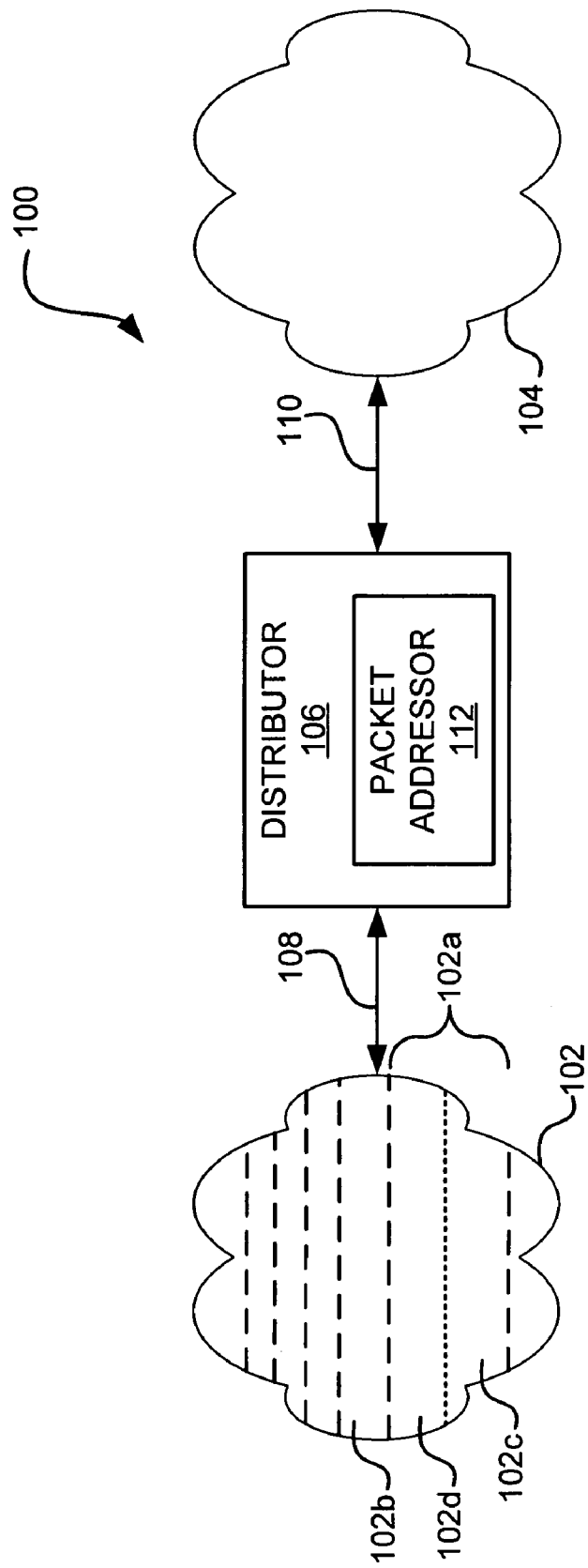
FIG. 1 shows a block diagram of a network including a distributor. The distributor includes a packet addressor.

FIG. 1 shows a block diagram of a network 100. Network 100 includes an external network 102 and an internal network 104. Though the invention is not limited to any particular application, it may be described as a system and method operating within network 100. Network 100 includes a distributor 106. Though not limited to any one function, distributor 106, in conjunction with other subsystems, is capable of switching data packets so that the data is directed to, or made available to, one or more destinations within external network 102 and internal network 104. External network 102 is organized based on the Open System Interconnection (OSI) model. External network 102 and internal network 104 communicates through, first data conductor 108, distributor 106, and second data conductor 110.

The OSI model includes seven layers. The second layer may be described as a data link layer 102a. The third layer may be described as a network layer 102b. The data link layer 102a includes a Media Access Control (MAC) sublayer 102c and a logical link control layer 102d. The MAC sublayer 102c utilizes addresses that uniquely identify network nodes. Those having ordinary skill in the art are familiar with the OSI model.

When data packets from external network 102 are presented to distributor 106, the distributor 106 makes data forwarding and classification decisions in regard to the ingress data packets. Packet addressor 112 utilizes the result of the forwarding and classification decisions to create an address header. The address header may be an Address Filtering Header (AFH). Distributor 106 includes at least one packet addressor 112.

Packet addressor 112 includes one or more integrated circuits associated with one or more memory elements. Packet addressor 112 can be implemented with any or a combination of the following technologies, which are each well known in the art: a discrete logic circuit(s) having logic gates for implementing logic functions upon data signals, an application specific integrated circuit (ASIC), a programmable gate array(s) (PGA), a field programmable gate array (FPGA), or the like.

Though only one packet addressor 112 is shown in distributor 106, a plurality of packet addressors 112 may be housed within a single distributor 106. The number of packet addressors 112 may be determined based on the number of input/output blades, slots, ports channels, and sub-channels associated with first and second data conductors 108 and 112. The address header resulting from the forwarding and classification decisions is associated with ingress data packets. The address header is utilized in the operation of one or more data switches (not shown) and controls, associated with distributor 106 and/or incorporated into distributor 106.

Though not limited to any particular application, packet addressor 112 may access status indicators from the MAC sublayer 102c. The status indicators from MAC sublayer 102c are utilized to initiate and control a sequence of memory element access operations. The memory elements may include, but are not limited to external ternary Content Addressable Memory (CAM) elements, Static Random Access Memory (SRAM) elements, and Virtual Port State Table (VPST) memory element. In addition to other sources of input data, such as the MAC sublayer 102c, memory elements such as the VPST memory element provide input data for making classification and forwarding decisions. Packet addressor 112 is programmable so that a host computer may program packet addressor 112 to allow greater flexibility in making classification and forwarding decisions. The classification and forwarding decisions are used to create the address header that is associated with the ingress data packets prior to transmission to internal network 104.

Packet addressor 112 is also capable of modifying egress data packets that are transmitted from the internal network 104 to the external network 102. The modification of the egress data packets may be, at least in part, based upon a transmission modification index (TXMI) created while the ingress data packets are undergoing classification and forwarding processing. Packet addressor 112 is also capable of filtering egress data packets, and/or marking egress data packets for filtering by distributor 106. In one embodiment, packet addressor 112 is programmable so that a host computer may program packet addressor 112 to allow greater flexibility in making modification and filtering decisions in regard to egress data packets.

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% or less should be considered to be explicitly within the scope of the stated value.

As used herein, the terms "software" or "instructions" or "commands" include source code, assembly language code, binary code, firmware, macro-instructions, micro-instructions, or the like, or any combination of two or more of the foregoing.

The terms "memory" and "memory element" refer to any processor-readable physical or logical medium, including but not limited to RAM, such as DRAM, SRAM, etc., ROM, EPROM, PROM, EEPROM, disk, floppy disk, hard disk, tape CD-ROM, DVD, queue, FIFO or the like, or any combination of two or more of the foregoing, on which may be stored one or more instructions or commands executable by a processor, data, or packets in whole or in part. "Memory" may also incorporate electronic, magnetic, optical, and/or other types of storage media. "Memory" may have a distributed architecture, where various components are situated remote from one another, but can be accessed by a processor.

The terms "processor" and "CPU" refer to any device capable of executing one or more commands or instructions and includes, without limitation, a general- or special-purpose microprocessor, finite state machine, controller, computer, digital signal processor (DSP), or the like. The term "engine" refers to any processing device, such as a processor and a CPU, together with components external to the processing device capable of executing one or more commands or instructions in coordination with the external components and generally includes memory elements that are configured to operate in coordination with a processor or CPU.

The term "logic" refers data instructions as implemented in hardware, software, or combinations of hardware and software. Those having ordinary skill in the art are familiar with the ability to interchange hardware and software to execute logic.

"Software" may be stored in memory or any computer readable medium and may include one or more separate programs, each of which comprises an ordered listing of executable instructions for implementing logical functions.

When any portion of the packet addressor 112 is implemented in software, the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. Portions of the packet addressor 112 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

A "stack" may be implemented through a first-in-first-out memory such as a FIFO.

The term "interface" can be, for example, one or more buses or other wired or wireless connections, as is known in the art. An "interface" may have additional elements, such as controllers, buffers (caches), drivers, repeaters, and receivers, to enable communications. Further, the "interface" may include address, control, and/or data connections to enable appropriate communications among the aforementioned components. Details specific to embodiments of various interfaces are also provided below.

The term "datagram" refers to a group of binary digits including data and control elements and an Address Filtering Header (AFH) that is switched and transmitted as a composite whole as is typically exists in the MAC sublayer 102*c*. The term "datagram" applies whether the "datagram" is located anywhere within network 100. A "datagram" includes one or more "packets." "Datagrams" may include packets that are defined under a plurality of reference models.

The term "packet" may be a datagram or any subpart of a datagram. Those having ordinary skill in the art are familiar with applications in which the term "packet" applies to: (1) a group of binary digits including data and control elements which is switched and transmitted as a composite whole, wherein the data and control elements and possibly error control information are arranged in a specified format; (2) a block of information that is transmitted within a single transfer operation; (3) a collection of symbols that contains addressing information and possibly error detection or correction information; (4) a sequence of characters with a specific order and format, such as destination followed by a payload; (5) a grouping of data of some finite size that is transmitted as a unit; (6) a frame; (7) the logical organization of control and data fields defined for any of the layers or sub-layers of an applicable reference model, including the OSI or TCP/IP reference models that operate within the MAC sub-layer; or (8) a unit of transmission for any of the layers or sub-layers of an applicable reference model, including the OSI or TCP/IP reference models.

The term "port" or "channel" refers to any point of ingress or egress to or from a switch or other entity, including any port channel or sub-channel, or any channel or sub-channel of a bus coupled to the port.

II. Packet Addressor Components and System Description

Figure 2:
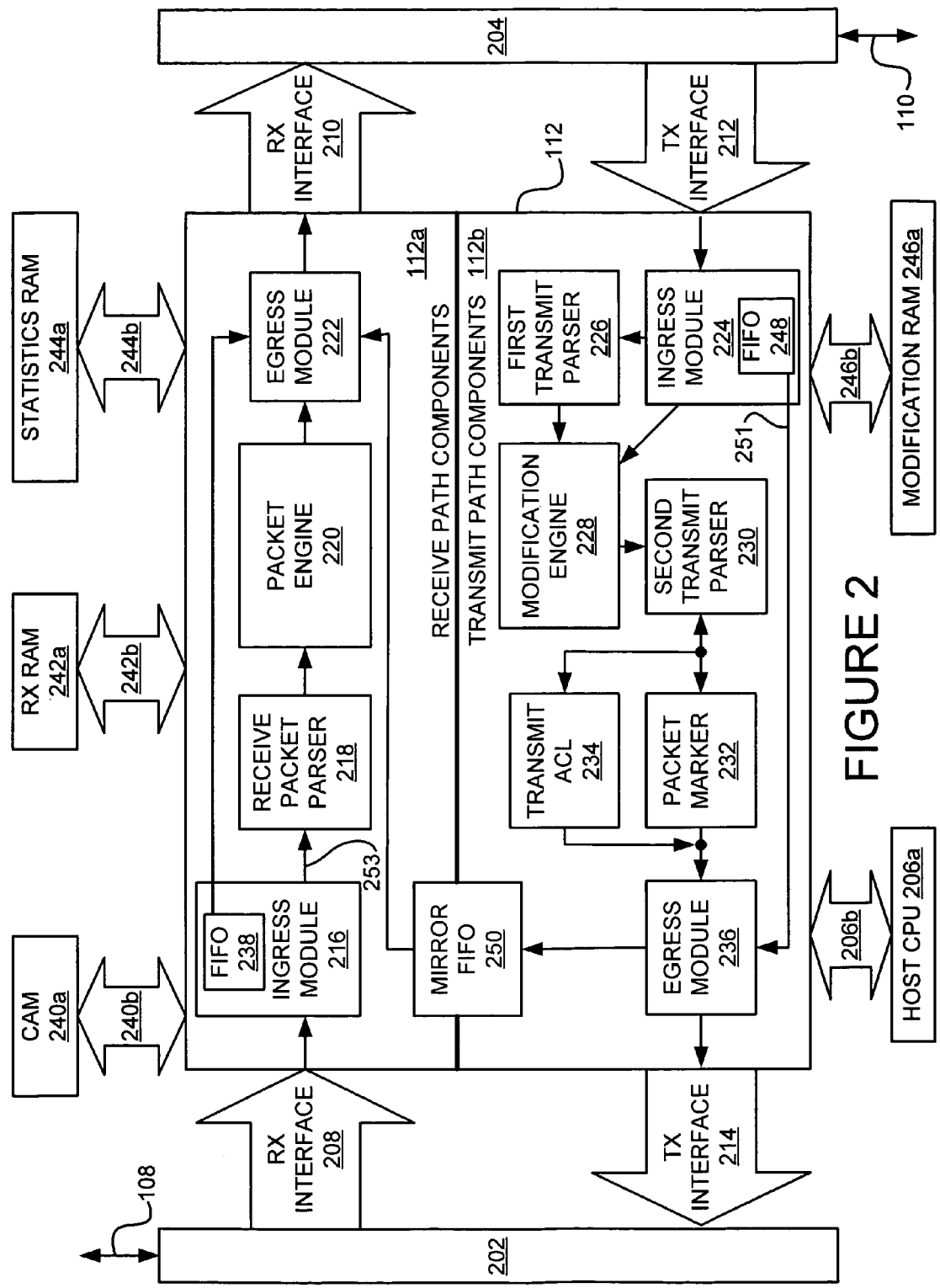
FIG. 2 shows a block diagram of portions of the distributor of FIG. 1.

FIG. 2 shows a block diagram of portions of distributor 106 of FIG. 1. Distributor 106 includes an external network packet transfer device 202, an internal network packet transfer device 204, a plurality of memory elements, and a host processor 206*a*, all in communication with each other via the packet addressor 112.

External network packet transfer device 202 may be a device such as that described in U.S. patent application Ser. Nos. 10/405,960 and 10/405,961, filed Apr. 1, 2003, which are both hereby fully incorporated herein by reference or other packet transfer devices known to those having ordinary skill in the art such as, but not limited to, FPGAs and interfaced ASICs. Internal network packet transfer device 204 may be a number of similar devices known to those having ordinary skill in the art such as, but not limited to the device described in U.S. patent application Ser. Nos. 10/405, 960 and 10/405,961, FPGAs and interfaced ASICs.

Packet addressor 112 interfaces between external network packet transfer device 202 and internal network packet transfer device 204. Packet addressor 112 classifies ingress data packets, forward ingress data packets, and perform Access Control List (ACL) functions on the ingress data packets. Packet addressor 112 may also modify egress data packets, mark egress data packets, and perform ACL functions on egress data packets.

Ingress data packets originating in the external network 102 are received by external network packet transfer device 202, then passed on to packet addressor 112 via the external network receive interface 208, then processed by packet addressor 112, and then passed on to the internal network packet transfer device 204 via the internal network receive interface 210. Egress data packets originating in the internal network 104 are received by the internal network packet transfer device 204, passed on to the packet addressor 112 via the internal network transmit interface 212, processed by the packet addressor 112, and passed on to external network packet transfer device 202 via the external network transmit interface 214.

Ingress data packets received by the external network packet transfer device 202 include a number of bytes, for example eight bytes, added to the ingress data packets by a network MAC processing element associated with external network 102. The added bytes form a null Address Filtering Header (AFH). The general structure of datagrams and the addition of null AFHs to data packets received from MAC layer 102c are known to those having ordinary skill in the art. Ingress datagrams, with the null AFH, are stored in a memory element, for example receive First in First Out (FIFO) memory element 238. Receive FIFO 238 may be considered a portion of a receive ingress module 216. Ingress datagrams, with the null AFH, remain in receive FIFO memory element 238 while packet addressor 112 operates on the ingress data packets, a copy of the ingress datagram, or a portion of the ingress datagram.

Packet addressor 112 performs a number of operations on ingress datagrams. The operations result in a new AFH that replaces the existing AFH, for example the null AFH, that is associated with the ingress datagrams held in receive FIFO memory element 238. Ingress datagrams with the new AFH are then released to the internal network packet transfer device 204. The new AFH includes the result of the classification and forwarding decisions, the TXMI, and Quality of Service (QoS) information.

Packet addressor 112 includes receive components 112a and transmission components 112b. Receive components 112a include receive ingress module 216, a receive packet parser 218, a receive packet engine 220, and a receive egress module 222. Transmission components 112b include transmit ingress module 224, first transmit parser 226, modification engine 228, second transmit parser 230, packet marker 232, transmit ACL 234, and a transmit egress module 236.

Packet addressor 112 is associated with various memory elements. Memory elements that are associated with the packet addressor 112 include receive FIFO memory element 238, a Content Addressable Memory (CAM) 240a, for example an external ternary CAM cascade memory element, a receive associated Random Access Memory (RAM) 242a, a receive statistics RAM 244a, and a transmit modification RAM 246a.

CAM 240a communicates with packet addressor 112 via CAM interface 240b. Receive associated RAM 242a communicates with packet addressor 112 via receive associated RAM interface 242b. Receive statistics RAM 244a communicates with packet addressor 112 via statistics RAM interface 244b. Transmit modification RAM 246a communicates with packet addressor 112 via transmit modification RAM interface 246b.

In one embodiment, the datagram undergoing processing by the packet processor 112 has a plurality of encapsulated layers, and the receive packet parser 218, the first transmit parser 226, and the second transmit parser 230 are configured to parse the datagram by providing context pointers pointing to the start of one or more of the encapsulated layers. In a second embodiment, the datagram undergoing processing by the system includes a first packet forming the payload portion of a second packet, each of the first and second packets having a plurality of encapsulated layers, and each of the receive packet parser 218, the first transmit parser 226, and the second transmit parser 230 are configured to parse the datagram by providing context pointers pointing to the start of one or more of the encapsulated layers of the first packet and one or more of the encapsulated layers of the second packet.

Receive packet engine 220 executes a number of operations on ingress data packets. The operations may include a search of CAM 240a for forwarding and/or ACL decisions, virtual port state processing, quality of service classification, exception processing, and statistical updates based on the operations performed on the ingress data packets. Receive packet engine 220 executes a number of cycles of the operations. At the conclusion of a cycle, the packet addressor 112 overwrites the null AFH, or the previously revised AFH, with the results obtained from the current cycle. The new AFH includes a TXMI. The number of cycles and the number of operations performed by receive packet engine 220 is programmable and may be coordinated with the host processor 206a.

Egress datagrams enter the packet addressor 112 via internal network transmit interface 212. Egress data packets are stored in a transmit FIFO memory element 248 until they are processed by the modification engine 228. Modification engine 228 uses the TXMI of the new AFH resulting from the operations performed by the receive components 112a to determine and perform any modifications required for the egress data packets. Egress data packets are also processed by packet marker 232 and transmit ACL 234. Transmit ACL 234 includes a transmit ACL processor 234a (FIG. 7B) that accesses a transmit ACL CAM 234b (FIG. 7B). The results of the transmit ACL 234 and the packet marker 232 are combined and passed to transmit egress module 236 for transmission via external network packet transfer device 202. Egress data packets may also bypass many of the transmission components 112b via data path 251.

FIG. 2 also shows a host processor interface 206b and an egress mirror FIFO 250. Host processor interface 206b interfaces between host processor 206a and packet addressor 112. Egress mirror FIFO 250 allows egress data packets to be sent back to the switches associated with distributor 106 for the purpose of egress packet mirroring. While novel embodiments concerning egress packet mirroring are described in this document, those having ordinary skill in the art are familiar with the general concept of packet mirroring.

III. System Components in Detail

FIG. 2 includes the following components:

A. CAM 240a

Packet addressor 112 uses CAM 240a to perform searches of ingress data packet in order to make a forwarding and classification decision. CAM 240a and receive associated RAM 242a, together with other memory elements, acts as a Forwarding Database (FDB) for receive packet engine 220 operations. CAM 240a is searched using a key formed by receive packet engine 220. CAM 240a returns the address of the highest priority matching address along with a match flag indication (match or no match).

CAM interface 240b is programmable so that CAM 240a devices from a plurality of vendors may be supported. In one embodiment, packaging addressor 112 executes only 72-bit and 144-bit key searches. In one implementation, CAM 240a may be ternary such that entries in CAM 240a have a data and mask field allowing don't care settings for any bit position. By structuring the CAM 240a table entries in prefix length order (mask length order), Longest Prefix Match (LPM) searches may be performed. In another implementation, the CAM 240a searches are binary, or combinations of binary and ternary.

B. Memory Interfaces 240b, 242b, 244b, and 246b

A programmable CAM interface 240b supports CAM devices that use a three-way interface architecture consisting of a Command Bus, Key Bus and Result Bus. CAM interface 240b supports cascading two, three or four CAM devices to provide depth expansion of the effective CAM table across multiple physical CAM devices. CAM interface 240b may provide a CAM table size (either a single device or multiple cascaded devices) of one million 72-bit entries, i.e., a 20-bit match address. This translates to a maximum configuration device size of 72 Mbit or a cascade of devices whose densities sum to 72 Mbit equivalent single device density.

Figure 3:
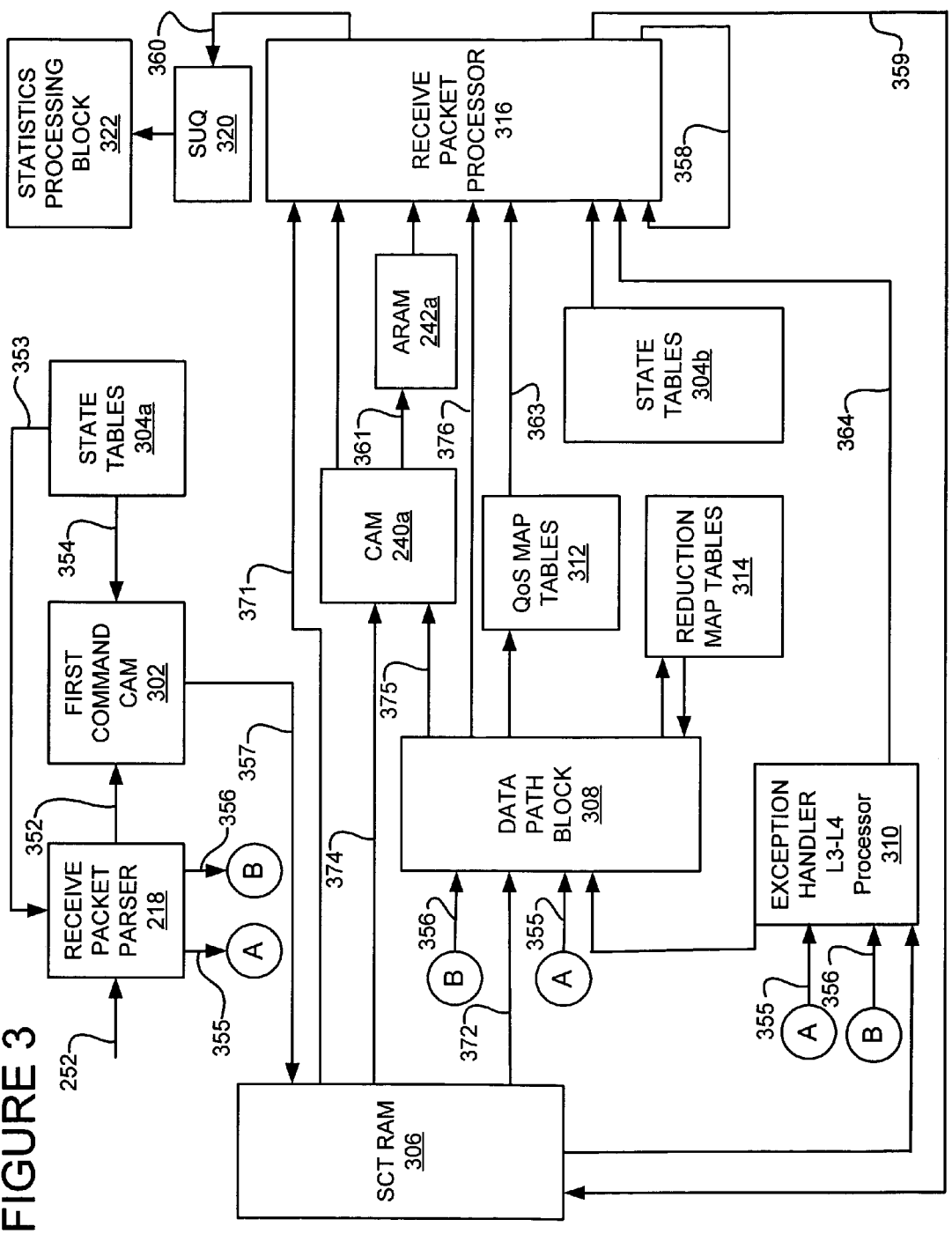
FIG. 3 shows a flow diagram of one embodiment of the functions associated with the receive components of the packet addressor of FIG. 1.

CAM interface 240b provides two access mechanisms for ingress data packet search operations and host CPU 306a operations. Ingress data packet search operations are performed by receive packet processor 316 (FIG. 3). Ingress data packet search operations are controlled by fields in a Sequence Control Table (SCT) data word associated with that processor 316 cycle. In one embodiment, only CAM 240a search operations of either 72 or 144 bits must be defined in the SCT data word. The SCT supplies the CAM command, key and miscellaneous control fields as inputs to CAM 240a. CAM 240a responds with match flag indications along with a match address. The match flag and match address are utilized by the receive packet processor 316 to access associated data in receive associated RAM 242a and to update the processor 316 state at the end of the current cycle.

Host processor 206a utilizes a mailbox function to access CAM 240a. SCT RAM 306 (FIG. 3) is not involved with host processor 206a access to CAM 240a. The CAM mailbox supplies CAM command, key and miscellaneous control fields as inputs to CAM 240a. CAM 240a responds with read data if a read cycle is being performed. Match flags and match address fields are not returned to the host processor 306a for any host processor 306a search operations. However, such results may be readable from the CAM 240a register set.

In one implementation, the interfaces 240b, 242b, 244b, and 246b may be a QDR- or DDR-type interface as described in U.S. patent application Ser. No. 10/655,742, filed Sep. 4, 2003, which is hereby fully incorporated by reference herein as though set forth in full.

C. Receive Associated RAM 242a

Receive associated RAM 242a provides associated data for entries in CAM 240a. Receive associated RAM 242a, together with other memory elements such as CAM 240a, act as the FDB for receive packet engine 220 operations. Receive associated RAM 242a is accessed using the match address returned by CAM 240a as a result of a search operation. Receive associated RAM 242a entry data may be used to supply the forwarding information for the packet that is associated with a search operation match on a particular CAM 240a entry.

Receive associated RAM 242a may be a QDR-II b2 RAM device. QDR architecture provides separate DDR read data and write data ports, eliminating bus turn cycles. The b2 designation indicates the RAM device supports two word burst operation (as opposed to four word burst operation).

Receive associated RAM interface 242b requires that the RAM banks be constructed from pairs of x18 devices or a single x36 device. Receive associated RAM interface 242b supports cascading two such banks of RAM devices to provide a logical RAM 242a that spans the two physical RAM banks. Receive associated RAM interface 242b scales with the size of CAM 240a.

D. Receive Statistics RAM 244a

Receive statistics RAM 244a provides statistics data for entries in CAM 240a. Statistics RAM 244a is not part of the FDB as far as forwarding decisions are concerned. Statistics RAM 244a may be accessed using the match address returned by the CAM 240a as a result of a search operation. Statistics RAM 244a entry data may be used to maintain a statistical record that is associated with CAM 240a entries. The statistical record includes two counts, reflecting the number of ingress data packet search operations that have matched on that entry, along with the total byte count of the ingress data packets associated with those hits. A higher-level matrix statistical mode may be implemented where the one-to-one correspondence of CAM 240a entries to statistics RAM 244a entries does not apply.

Statistics RAM 244a may be QDR-II b2 RAM devices. Receive statistics RAM interface 244b requires that each bank of RAM 244a be constructed from pairs of x18 devices or a single x36 device. Receive statistics RAM interface 244b supports cascading two such banks of RAM devices to provide a logical RAM that spans the two physical RAM banks.

Receive statistics RAM 244a scales with the size of CAM 240a. CAM 240a entries requires 144 bits of receive statistics RAM 244a data. For example, a CAM 240a table of one million entries requires a total receive statistics RAM 244a resource of 144 Mbits (assuming the use of simple statistics mode, i.e. per CAM 240a entry, as opposed to matrix statistics mode). In one embodiment, the receive statistics RAM Interface 244b supports a maximum RAM 244a device address bus width of 21 bits. If matrix mode is used for statistics operations, then either more statistics RAM 244a must be provided specifically for that function or unused space in the entry-based region of the statistics RAM 244a must be utilized.

In one configuration, packet addressor 112 is configured to maintain packet statistics indicating the cumulative size of packets which have met specified processing conditions or hits, and the statistics update logic, such as statistics updater 636 (FIG. 6), upon or after a packet size determiner has determined the size of a packet, is configured to increment a cumulative size statistic for a particular that particular processing condition or hit. In one example, packet addressor 112 maintains statistics indicating the cumulative size and number of packets that have resulted in each of a plurality of ternary CAM 240a hits.

E. Transmit modification RAM 246a

Transmit modification RAM 246a provides data and modification control structures for packet modification operations performed by modification engine 228. Transmit modification RAM 246a is accessed using a TXMI supplied by the operation of the receive components 112a. The TXMI is conveyed to the transmit components 112b through the new AFH header.

Transmit modification RAM 246a may be QDR-II b2 RAM devices. The transmit modification RAM interface 246b requires banks of RAM 246a constructed from pairs of x18 devices or a single x36 device. Transmit modification RAM interface 246b supports cascading banks of RAM devices to provide a logical transmit modification RAM 246a that spans two physical RAM banks. Transmit modification RAM interface 246b supports a transmit modification RAM 246a address bus width of 21 bits.

F. Clocking

Various subsystems within network 100 operate according to different clocks. Interfaces 208, 210, 212, and 214, associated with external network packet transfer device 202 and internal network packet transfer device 204 may be source synchronous. Source synchronous interfaces send a sampling clock signal along with other data provided to distributor 106.

Packet addresser 112 employs a system clock. The system clock is used for most of the packet addresser 112 processes including receive packet engine 220 and modification engine 228. Host processor 206*a* may have its own clock.

G. Parsers

1. Parser Operation

Packet addresser 112 includes receive packet parser 218, first transmit parser 226 and second transmit, parser 230. The operation of parsers 218, 226, 230, and 612 (FIG. 6) is similar. Therefore, parser operation is generally described in regard to receive packet parser 218. However, the parser control structures exported by parsers 218, 226, 230, and 612 may differ. The parser control structure depends upon the module performing the parsing operation.

Parsers 218, 226, 230, and 612 (FIG. 6) initially employ a state machine to decode Start-of-Packet (SOP) events. Parsers 218, 226, 230, and 612 include chains of comparator functions for decoding packet data. The comparator functions decode the packet data based on a combination of programmable and static packet data structures. The parsing operation may only operate during the first 128 bytes of datagram burst data from SOP. The first 128 bytes includes the AFH field—the null AFH field in the case of receive packet parser 218. The parsing operation may terminate if an End-of-Packet (EOP) indication is received prior to the parsing operation being completed during the first 128 bytes.

Parser 218 initially determines where the packet data starts, relative to the start of the data packet burst. An AFH offset of 8 bytes is provided to skip over the prepended null AFH. The subsequent starting point for parser 218 operation may be determined by an Interface Configuration Table (ICT) within state tables 304 (see FIG. 3 for state tables 304*a* and 304*b*). The ICT indicates whether a sub-channel is an Ethernet or Packet-Over-Sonet (POS) data structure. Distinct programmable offsets are provided for Ethernet and POS data structures.

For POS data structures the Parent Process ID (PPID) may be inspected to determine whether the data structure is a bridged or a routed POS data structure. For bridged POS data structures, a programmed offset may be added to skip pad and control bytes before the MAC header. For POS routed data structures, an offset may be used to skip to the start of the payload data.

After determining the data structure and the location of the payload data, parser 218 performs various operations on Protocol Data Units (PDUs) including, but not limited to operations on: (1) MAC headers; (2) Virtual Local Area Network (VLAN) headers; (3) MAC control fields; (4) MultiProtocol Label Switching (MPLS) stacks; and (5) IP headers.

In regard to the MAC headers operation, receive packet parser 218 may extract the MAC DA field and skip ahead twelve bytes to cover both MAC DA & SA fields. The MAC DA may be decoded to provide router address, multicast and broadcast flags. In the case of the router address, eight addresses is provided where a hit on any one is considered a hit. An eight-bit vector is employed to record which address entries matched.

In regard to the VLAN (802.1q) header(s), receive packet parser 218 examines the Ether Type field and determine the presence of any 802.1q VLAN headers. Two separate programmable probes are provided with unique Ether Type settings to decode nested VLANs in the packet. The result of the compare function is a four-bit field reflecting the match status of Vlan0:Probe0, Vlan0:Probe1, Vlan1:Probe0, and Vlan1:Probe1. The four-bit field is referred to as the VLAN Match Matrix.

In regard to the MAC control fields, encapsulation processing may determine whether the packet is Ethernet II, LLC or SNAP. The encapsulation also extracts the relevant MAC control field to identify the LLC payload. The relevant MAC control field is used to generate several flags identifying IP v4, IP v6, MPLS and IPX services.

In regard to the MPLS stacks operation, based on detection of the MPLS Ether Type, an MPLS header walker may be activated to determine the number of MPLS headers present in the stack. The header walker terminates on detection of the Bottom-Of-Stack (S) bit. In the case of a routed PoS Service, the receive packet parser 218 operations up to the MPLS operation are ignored. The MPLS operation initiates parsing commencing at the point determined by the POS routed service offset, incremental from the previous AFH/PPID processing stages.

In regard to the IP headers operation, an IP/Next Header processor may be activated based on detection of an initial IP v4 or v6 header structure in the ingress data packet. An iterative process is used to detect and parse Next Header (NH) structures to the point where hardware determines it cannot continue. All Next Header types have a control bit (separate bits for v4 and v6) to determine whether they should be parsed in hardware. Detection in the ingress data packet of a NH structure that is not enabled in the parser will cause parsing of the NH structures to immediately terminate. The IP/Next Header processor includes support for Protocol Independent Multicast (PIM) (Sparse Mode) and Generic Routing Encapsulation (GRE) header decoding. Separate control bits are provided to enable PIM and GRE processing for v4 and v6 packets. The IP/Next Header processor supports up to two nested IP headers (deemed Outer and Inner) in order to handle v4-v6 tunnels and similar services. In the case where two IP headers are detected, the NH processing function is activated for both. The point at which the NH processor terminates, after the last IP header is found, identifies the last header as being the L4 service—by definition, i.e. there is no NH control set for User Datagram Protocol (UDP), Transmission Control Protocol (TCP), etc. The IP/Next Header processor also decodes fragment information to provide fragment offset information for both outer and inner IP header structures.

2. Parser Duplicate Pages

In order to support Transparent LAN Services (TLS) the parser chain from MAC Header onwards is duplicated to provide two sets of results, referred to as Page 0 and Page 1. The second parser chain (Page 1) is used to decode the encapsulated LAN service and is activated based on detection of the end of the MPLS stack in Page 0. If no MPLS stack in Page 0 is detected, the second parser chain is activated immediately following the encapsulation processing stage. The operation of the two chains is identical and they share a common control register set. The Page 1 parser chain may be "forked" from the main Page 0 parser chain in that both chains operate concurrently on the packet.

3. Parser Result Structures

Figure 6:
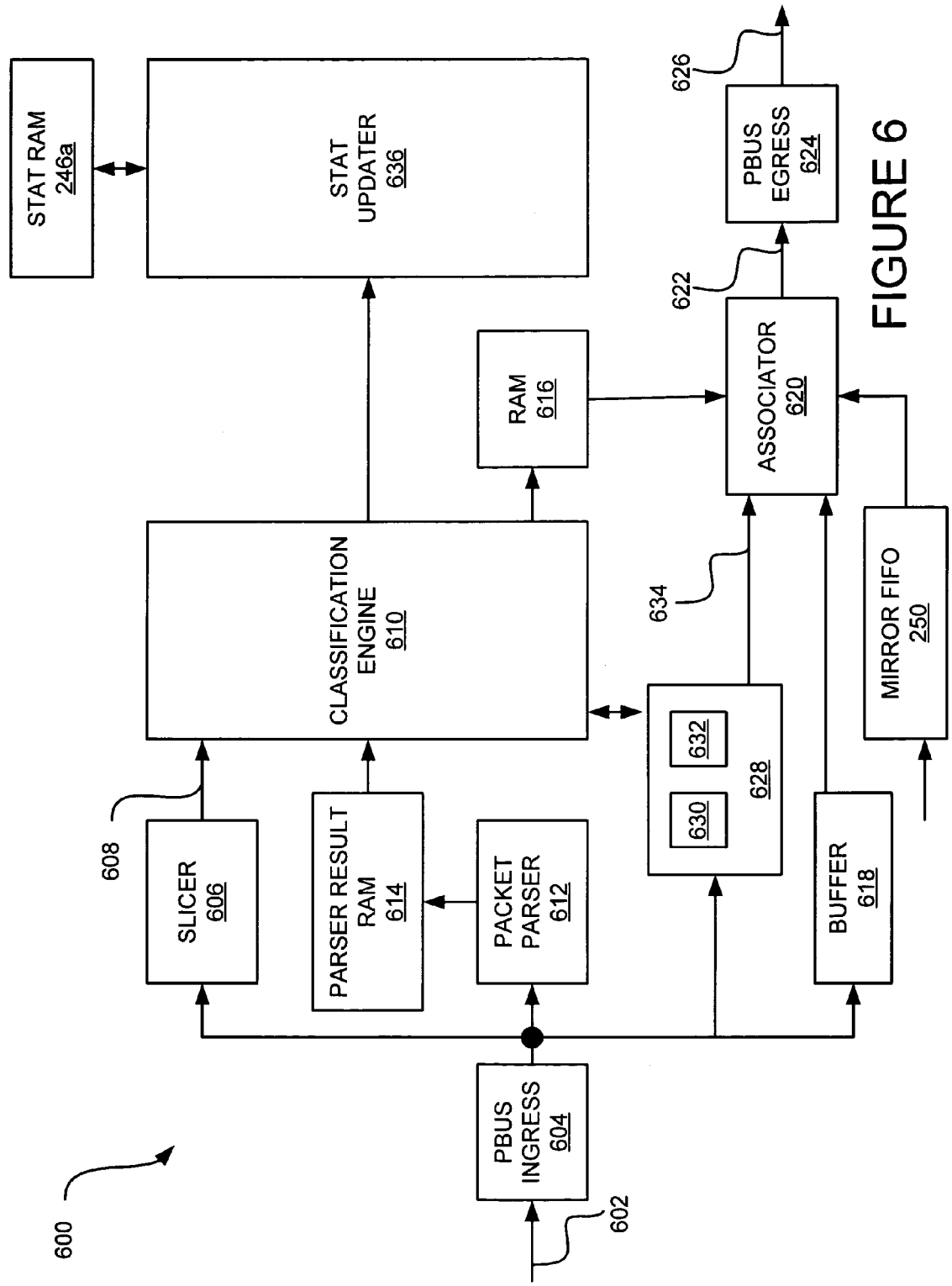
FIG. 6 illustrates another embodiment of the packet addressor of FIG. 1.

The parser operations result in two result structures (Page 0 and Page 1) that may include, but are not limited to: (1) context pointer sets; (2) packet flags; (3) encapsulation sets; (4) VLAN sets, (5) MPLS sets, (6) IP sets, (7) IP inner sets; and (8) L4 sets. Packet addresser 112 utilizes a different subset of the result structure generated from the operation of parsers 218, 226, 230 and 612 (FIG. 6).

Context pointer sets provide information regarding segments of the data packets. The data within the packet may be accessed at a location based upon the value of context pointers and any offset. For example, the following context pointers may be employed: Context 0—Raw data; Context 1—MAC Header Start; Context 2—Encapsulation/EtherType Start; Context 3—MPLS Start; Context 4—L3 Outer Start; Context 5—L3 Inner Start; Context 6—L4 Start. If a structure is absent from a data packet, the context pointer is set to the same value as the previous context pointer. Context 0 may also be the first byte of the packet including the AFH which may be a null field upon initial presentation to the receive packet parser 218. The context pointer set allows data reference controls that are based on a context:offset structure and thus can normalize data selection operations.

The sum of context pointers and an offset may be used to generate the destination address for processor commands. This allows operations performed by transmit components 112b to be packet protocol independent. This results in great use of generic process sequences in receive packet engine 220 and modification engine 228.

Packet flags are generated based on, for example, MAC DA decodes, including, but not limited to, "My-Router-Address" (RADDR), Multicast & Broadcast detection, EtherType/PPID values. Encapsulation sets provide the EtherType, LLC or PPID structure associated with the data packet. Additional flags may be associated with Routed PoS Service, LLC or SNAP frames.

The VLAN set provides the full VLAN Tag(s) for up to two 802.1q structures. The VLAN set also provides a 2×2 matrix resulting from two VLAN probes compared to two 802.1q structures present in a packet, along with a detected VLAN count field.

The MPLS Set provides a count of how many MPLS labels were detected in the data packet.

The IP set and IP inner set provides data regarding, but not limited to: (1) the type of IP set—two bit field to indicate v4/v6 or not present; (2) fragment decode—a single, first, middle or last; (3) a don't fragment decode; (4) protocol resulting from NH processing; and (5) NH exception control.

The L4 set may provide a partial UDP or TCP one's complement sum (OCS) with the pseudo-header fields backed-out from the packet UDP or TCP checksum field.

H. Host Processor 206a

Host processor 206a has access to components of the receive packet engine 220 and other components, including but not limited to, memory elements, tables, CAM 240a, receive associated RAM 242a, receive statistics RAM 244a, and transmit modification RAM 246a. Thresholds are provided to determine the bandwidth associated with processed ingress data packets and host processor 206a processing operations.

I. Packet Marker 232 and Egress ACL 234

In one implementation, a post processor system, in one embodiment packet marker 232 and egress ACL 234, is configured to compute a checksum for a modified packet responsive to data provided by third packet parser 230. In one embodiment, the post processor system is configured to independently calculate a layer three (IP) and layer four (TCP/UDP) checksum.

Egress ACL 234 logic is configured to arrive at an ACL decision with respect to a packet. In one implementation, four ACL decisions can be independently performed: (1) default ACL action; (2) CPU copy; (3) mirror copy; and (4) kill. The default ACL action may be set to kill or allow. A CPU copy action forwards a copy of the packet to a host processor 206a. The mirror copy action implements an egress mirroring function (to be discussed in more detail later), in which a copy of the packet is forwarded to mirror FIFO 250 and then on to the egress module 236 of the packet addressor 112. The kill action either kills the packet or marks it for killing by a downstream MAC processor.

Packet Marker 232 logic is configured to implement a packet egress marking function in which certain packet marking control information for a packet generated by receive components 112a is used to selectively modify one or more QoS fields in the packet.

IV. Description of Receive Components

FIG. 3 shows a flow diagram of one embodiment of the functions associated with some of the receive components 112a of packet addressor 112 of FIG. 1. FIG. 3 includes receive packet parser 218, first command content addressable memory (CAM) 302, and state tables 304a and 304b. The signal on data paths 355, 356 and 357 of FIG. 3 includes data created due to a preliminary operation of receive packet parser 218, first command CAM 302 and state tables 304a. Signals on data paths 355, 356 and 357 will generally be created once upon receipt of an ingress data packet while other operations, generally shown in FIG. 3 as occurring between SCT RAM 306 and receive packet processor 318, may occur one or more times depending upon the programming of packet addressor 112.

A. Initial Cycle

First command CAM 302 and state tables 304a and 304b, along with other blocks referenced by 3XX numerals in FIG. 3, may be considered as included in receive packet engine 220 of FIG. 2. State tables 304a and 304b include, but are not limited to, an Interface Configuration Table (ICT), a Port State Table (PST), a VLAN State Table (VST), and a Virtual Port State Table (VPST). State tables 304a and 304b may be integrated, or segregated, into memory elements without changing the nature of the invention. In regard to understanding the invention, state tables 304a and 304b may be considered to both include the ICT.

ICT table within state tables 304a and 304b provides both an interface type field (Ethernet or PoS) and a PST table active indication, which selects whether PST or VST supplies data for each sub-channel.

In FIG. 3, an ingress data packet is received on data path 253. The ingress data packet is provided by external network receive interface 208 (FIG. 2). Receive packet parser 218 provides a key and control data to first command CAM 302 over data path 352. Receive packet parser 218 receives control data from an ICT in state tables 304a over data path 353. Receive packet parser 218 provides packet data to data path block 308 and exception handler 310 over data path 356. Receive packet parser 218 provides a result structure including control data to data path block 308 and exception handler over data path 356.

1. First Command CAM 302

First command CAM 302 determines the starting point in the SCT RAM 306 for the initial lookup sequence performed on an ingress data packet. First command CAM 302 is searched using different key formats depending on the form of the ingress data packet, the forms including but not limited to, EtherType, LLC, POS Bridged Service, and POS Routed Service.

When the ingress data packet is EtherType, LLC, or POS Bridged Service, first command CAM 302 is searched using a key that includes sixteen bits of an EtherType or LLC Field, plus eight bits of an IP Protocol Field, plus a Multicast Flag, plus a unified RADDR Flag, plus a four bit VLAN Match Matrix.

When the ingress data packet service is POS routed service, the first command CAM 302 is searched using a key that includes a sixteen-bit PPID field and an eight-bit IP Protocol field.

Entries in the first command CAM 302 have a two-bit type field so that entries can be uniquely matched by EtherType, LLC or PPID fields. First command CAM 302 has a total of sixty-four entries that may be arbitrarily assigned to any of the three data format types. First command CAM 302 operates by considering an entry if all eighteen bits of both the entry EtherType/LLC+RADDR, MCAST field (or sixteen bits of the PPID field) and the corresponding key fields match. However, first command CAM 302 entries may also include a control field to augment the basic search operation.

First command CAM 302 control fields may include, but are not limited to: (1) a one-bit IP protocol compare enable; and (2) a one-bit PPID MSB compare enable. In regard to one-bit IP protocol compare enable, if clear the IP protocol field in the entry and the key is ignored, i.e., treated as a wildcard. If set, the IP Protocol field in both the CAM 302 entry and the key must match. In regard to the one-bit PPID MSB compare enable, if clear, all sixteen bits of the PPID in the entry and the key must match for a hit. If set, only the MSBs of each field are compared.

In the event of multiple matches in the first command CAM 302, the highest matching entry is used, so software may populate the first command CAM 302 to minimize wildcard matches. I.e., software may install the most specific match entries in the highest first command CAM 302 locations. In the event of no first command CAM 302 matches, separate default results values are provided for EtherType, LLC, and PPID search types.

The associated data, or the default result data, extracted from the first command CAM 302 search operation provides the initial SCT index value which is provided to the Sequence Control Table (SCT) RAM 306 over data path 357. In the case of Routed POS service, the associated data may also provide an Ingress VLAN ID for association with the service when processed by packet addresser 112.

Receive packet parser 218 compares an ingress data packets MAC DA field with programmed RADDR register settings. There are eight register settings. The eight compare result bits result bits from the receive packet parser 218 may be processed to form a single RADDR flag. Mask fields from the Port State (PST) and VLAN State Tables (VST) of state tables 304b are utilized to perform a bit wise "AND" on the match vector so that there is Port-based and VLAN-based control over which of the eight router address fields are considered valid. A final reduction "OR" operation on the masked match vector creates a single RADDR flag for use in the first command CAM 302 lookup logic.

2. State Tables 304a

ICT in state tables 304a provides control data to first command CAM 302 over data path 354. ICT in state tables 304a also provides control data to receive packet parser over data path 353.

B. Subsequent Cycles

In FIG. 3, SCT RAM 306 receives the initial SCT index from first command CAM 302. Data path block 308 and exception handler 310 receive packet data from receive packet parser 218 over data path 356. Data path block 308 and exception handler 310 also receive parser data from receive packet parser 218 over data path 355. FIG. 3 shows CAM 240a and receive associated RAM 242a from FIG. 2. FIG. 3 also shows Quality of Service ("QoS") map tables 312, reduction map tables 314, state tables 304b, and receive packet processor 316.

1. SCT RAM 306

Sequence Control Table (SCT) RAM 306 provides control data to receive packet processor 316, data path block 308, and exception handlers 310 over data paths 371, 372, and 373 respectively. SCT RAM 306 also provides a CAM command to CAM 240a over data path 374. Data selection operations in the SCT RAM 306 use a context and an offset construction. The context:offset construction allows packet data to be selected by specifying the context for the data and an offset to the required data within that context.

SCT RAM 306 acts as the main control program for the receive packet processor 316 and surrounding functions. In one embodiment, SCT RAM 306 is organized as 256×512 bits—each CAM 240a operation accesses adjacent even-odd locations for each half cycle of a CAM 240a search slot (each CAM 240a search cycle uses two system clocks), so SCT RAM 306 supports 128 CAM 240a operations. SCT RAM 306 provides control fields for generating/controlling lookups for: (1) Next SCT index for search hit and miss; (2) Exception Handler and L3-L4 Processor 310 selects; (3) Priority settings for resolving all PTI, TXMI, and QoS fields for the lookup; (4) CAM Search Command+Controls+Key Generation fields; (5) Link aggregation index control; (6) QoS map table 312 and reduction map table 314 controls; (7) Statistics matrix control; (8) VLAN control; and (9) Miscellaneous controls, such as but not limited to, Learn, Route, and Redirect enables.

2. Data Path Block 308

Data Path block 308 receives an exception handler from exception handler processor 310. Data path block 308 provides a CAM key to CAM 240a over data path 375, a link aggregation hash to receive packet processor 316 over data path 376, a QoS map index to QoS map tables 312, and a reduction map index to reduction map tables 314. Reduction map tables 314 may provide a reduction map result to data path block 308.

Data path block 308 implements data selection operations used by receive packet processor 316 to: generate a search key to CAM 240a; generate reduction mapped packet data used to generate the key to CAM 240a, generate packet to QoS mapping data for MPLS, IP v4 ToS, and IP v6 ToS operations; and to generate hashes for egress link aggregation.

Data path block 308 may be a hierarchy of multiplexers controlled by data selection fields. Data input to the data path block 308 processing stages consists of the first 128 bytes of packet data along with 128 bytes of process data. The process data consists of a mixture of SCT RAM 306 supplied fields—for example but not limited to, a CAM 240a table identifier for entry typing, data from reduction map tables 314, data from receive associated RAM 242a from a previous cycle, the data structure generated by the receive packet parser 218 generated data structure, and the state of the receive packet engine 220 at the start of the current lookup cycle.

3. Reduction Map Tables 314

Reduction map 314 tables allow the key to CAM 240a to use compression on packet fields that have reduced state spaces, for example, but not limited to, TCP Flags, IP ToS, and Protocol. Reduction map 314 is a set of four reduction map tables which each provide 256×4 bits that allow byte to nibble mappings for any byte in the data path input field, packet or process data.

4. Exception Handlers Processor 310

Exception handlers processor 310 provides data path block 308 with an L4 invalidate flag. The L4 invalidate flag may be used to invalidate (mask off) L4 data structures when they are deemed not to be valid. Link aggregation hash generation may also be masked.

Exception handler processor 310 includes a set of programmable exception handlers for pre-defined packet types. The SCT RAM 306 selects an exception handler for a particular lookup operation, allowing the lookup cycle to change the active exception handler during processing. Exception handler processor 310 provides sets of programmable decision points specific to an exception handler, including a default. In this manner, exception handlers not only provide processing traps for packet problems, for example but not limited to bad IP v4 checksum, but also define the default processing decision for the receive packet processor 316 should no CAM 240a lookups result in a hit. Exception handler processor 310 sets may include, but are not limited to: L2; MPLS; IP v4; IP v6; and IPX.

The data structure returned by an exception handler decision point consists of a Port Tag Index, a Port Tag Index priority and an SCT NOP flag. Including this data allows programmable control over the ability of the exception scenario to override packet lookup operations and specifically dictate the forwarding decision on a per exception basis. The SCT NOP flag allows an exception to force the search sequence in the receive packet processor 316 to enter the NOP state. The NOP state being an instruction to perform no further packet processing operations.

Exception handlers have four sets of masks. Masks may be used to gate whether an exception term is active. SCT RAM 306 supplies the exception handler mask select and the three of the masks for each handler may be configured for Bridging, Unicast Routing and Multicast Routing operations, with one spare mask.

The SCT RAM 306 also supplies a context select field. The context select field determines which context is used as the basis for packet data exception processing. For normal routing operations, the context may be set to L3 Outer or L3 Inner. However, in order to support GRE tunneling of IPX/MPLS, etc., exception handlers may use the L4 context for handling of the embedded payload of such services.

Exception handler processor 310 is also be the controlling entity for determining when L4 data should be invalidated in the key to CAM 240a and the link aggregation hash generation function. The IP protocol field extracted by the receive packet parser 218 may be used to access a table of 256 entries. The table returns a two-bit control value to provide controls to the data path block 308 including, but not limited to: (1) Always Invalidate, (2) Never Invalidate; and (3) Invalidate based on Fragment Type.

5. State Tables 304b

State Tables 304b include, but are not limited to: (1) an ICT table; (2) Virtual Port State Table (VPST): (3) VLAN State Table (VST); and (4) and Port State Table (PST). The VPST RAM is logically structured as 4096×10 addresses x4 data bits for 4096 VLANs across 10 sub-channels. In one embodiment, the four data bits associated with Virtual Ports are: (1) STP.FWD; (2) STP.LEARN; (3) NoRoute; and (4) and Mirror. The VPST is accessed based on the active VLAN structure in the control pipeline of packet processor 316.

A VST provides ingress VLAN-based mapping to all QoS fields, egress mark sets (Select and Mask), random early drop indication, statistics index base for matrix operations, router Id selection, QoS map scheme selection, statistical sample bin, and router address comparison mask. The VST is organized as 4096×108 bits in an internal RAM combined with the PST. The VST is accessed based on the active VLAN structure in the receive packet processor 316 control pipeline. Alternatively, PST can supply all fields that can be supplied by VST. The ICT setting for PST active determines which table is active for a given physical port.

The PST provides the same data fields as VST, except is accessed using ingress port. The PST is organized as 256× 108 bits. Alternatively, VST can supply all fields that can be supplied by PST.

6. QoS Map Tables 312

The QoS map tables are organized as a set of four QoS map tables that provide 802.1p, IPv4 ToS, IPv6 ToS and MPLS Exponent (EXP) to QoS mapping. Each table has sixteen segments, the segment being selected from PST/ VSR field. QoS maps return all QoS fields—Ingress, Egress, and CPU, egress mark sets, along with a RED indication. IPv4 & IPv6 ToS tables are combined into a single 4096×72 RAM. 802.1p and MPLS EXP mapping tables are implemented as a separate 256×36 RAM in order to provide sufficient mapping bandwidth when processing MPLS labels in parallel.

7. Statistics Processor

Packet and byte counters are maintained in external statistics RAM 244a. The byte counters are incremented using statistics index values obtained from lookup operations performed on ingress data packets. Two statistics index generation modes may be utilized. First, the statistics index can be based on the match address in the CAM 240a array. Second, the statistics index can be based on a matrix from associated data fields across multiple CAM 240a lookup operations. The latter mode (the matrix mode) provides a way for programmable aggregation of ingress data packet statistics operations.

Statistics update events are written by the receive packet processor into statistics update queue (SUQ) 320. Statistics processing block 322 processes update requests from the SUQ 320 and performs read-modify-write operations to the relevant statistics entries stored in external statistics RAM 244a. Statistics processing block 322 is pipelined to perform all operations described, including a bypass function to handle coherency issues involved in continuous operations on the same statistics data structure.

The total statistics bandwidth offered is the same regardless of how the statistics index is generated. I.e., the total statistics index generation bandwidth does not exceed the CAM 240a lookup bandwidth. This means that typically the total number of statistics update requests for an ingress data packet will equal the ingress data packet lookup budget. So any matrix mode updates must be "paid for" by not using all available CAM 240a entry update statistics slots.

The SUQ 320 provides a small FIFO function that allows for peak statistics update bandwidth to exceed sustainable rates without dropping the update requests on the floor. I.e., count both CAM 240a entry mode and use both matrix modes for a given ingress data packet processing flow. The SUQ 320 may also then backpressure the receive FIFO 238 if it also runs full. However, these transient conditions exceed the steady-state bandwidth of the statistics update engine and thus may not be sustained.

8. Receive Packet Processor 316

Receive packet processor 316 provides a next SCT index to SCT RAM 306 on data path 359 and working data to itself on data path 358. At the end of the fixed, but programmable, number of cycles, receive packet processor 316 provides a new AFH for internal network 104. Receive packet processor 316 also provides data to statistics update queue (SUQ) 320 over data path 360.

Packet processor 316 is implemented as a circular pipeline. Strictly as an aid in comprehending one implementation of receive packet processor 316, packet processor 316 may be considered as analogous to a Ferris wheel. An initial load, for example an ingress data packet, results in the processing of buckets on the wheel. The wheel rotates for a fixed number of cycles with processing operations being performed on the data packet performed during the rotation. At the end of the number of cycles, the data packet is unloaded, with the new AFH provided to receive FIFO 238 where the new AFH is associated with the ingress data packet.

CAM 240a provides a match address to receive associated RAM 242a over data path 361, and CAM flags to receive packet processor 316 over data path 362. Receive associated RAM 242a provides data structure associated with the match address and the CAM 240a entry to receive packet processor 316.

QoS map table 312 provides QoS data to receive packet processor 316 over data path 363. State tables 304b provide QoS and control data to receive packet processor 316. Exception handlers 310 provides an exception result to receive packet processor over data path 364.

a. Brief Description of Processor Pipelines

Again, strictly as an aid in understanding one implementation of packet addressor 312, packet processor 316 may be understood as having three pipelines to manage and monitor processing operations and the state of receive packet engine 220 and associated components. The pipelines may be considered a control pipeline, an AFH pipeline, and a statistics pipeline.

i. Control Pipeline

The control pipeline tracks packet processor 316 load and unload events. The control pipeline also maintains the working control set associated with processing ingress data packets. The control pipeline includes static and dynamic segments. The static segment is loaded once at the start of processing and may include, but are not limited to, the following: (1) packet data handle; (2) packet length; and (3) the ingress port. The packet data handle is used to access packet data in receive FIFO 250. The packet length is used to determine packet reference errors.

The dynamic segment of the control pipeline may be updated during receive packet engine 220 cycles and may include, but is not limited to: (1) the context pointer set; (2) VLAN select; (3) VLAN; (4) parser page setting; and (5) the next SCT index for both the hit and miss scenarios for the CAM 240a search.

ii. AFH Pipeline

The AFH pipeline maintains the working AFH data structure. All elements of the AFH pipeline are dynamic, meaning they are revised during a receive packet engine 220 cycle. The first portion of the AFH pipeline supplies the AFH field written into the ingress data packet. The second portion of the AFH pipeline provides control information used to store priority settings for various AFH fields, for intermediate cycles of packet engine 220.

iii. Statistics Pipeline

The Statistics pipeline is used to maintain a statistics data structure. The statistics pipeline includes static and dynamic segments. The static segment of the statistics pipeline includes a packet statistics index handle for tracking statistics data between Start of Packet (SOP) and End of Packet (EOP) events. Generally, statistics updates include packet length so it is often preferable to consider EOP events. The dynamic segment includes two statistics matrix index values and statistics update queue 320 control. The statistics data structure is passed to the statistics processing block 322 at the completion of the last cycle associated with the ingress data packet.

b. Detailed Description of Processor Pipelines

Continuing with the pipeline analogy, the three pipelines may be described during an initial state, during lookup operations, during update operations, and during unload operations. During the initial state, the commencement of packet processing, the processor pipeline state(s) may be reset or configured as follows.

i. Initial State of Control Pipeline

During the initial state, the control pipeline is reset or configured so that: (1) The current SCT index is loaded with an initial SCT index value from first command CAM 302; (2) The current parser 218 page is set to 0; (3) The current VLAN select is set to 0; (4) The current VLAN is set to parser page 0, VLAN 0, or, in the case of a routed PoS Service, the VLAN field supplied by first command CAM 302; (5) The current context pointer set is loaded with parser 218 page 0 fields; (6) The current L3 select is set to 0 (Outer or Only) value; (7) The current IP control is set to page 0 L3 0 control set, including an indication of: (a) Fragment Type; (b) Don't_fragment; (c) Protocol; (d) Next Header; and (e) Exception Control; and (8) the Lookup Count is reset to an allocated packet budget.

ii. Initial State of AFH and Statistics Pipelines

During the initial state, the AFH pipeline is reset or configured to have all values cleared to zero. During the initial state, the statistics pipeline is reset or configured to have the matrix index base values set the values specified in the PST/VST tables within state tables 304b.

iii. Pipelines During Lookup Operation

During the lookup operations, packet processor 316 executes at least the following steps: (1) Fetch the SCT based on the current SCT index; (2) execute CAM 240a search; (3) select an active Exception Handler from exception handlers 310; (4) execute QoS mapping operations, using state tables 304b for PST, VST, and QoS map tables 312; (5) execute VPST access; and (6) based on the CAM 240a search result, access receive associated RAM 242a.

At the end of the lookup operation, packet processor 316 receives data and control information from the resources accessed. Processor 316 creates an updated pipeline set that is used for the next cycle.

iv. Update Operations of Control Pipeline

During update operations of the control pipeline, receive associated RAM 242a data may be ignored if there is no CAM 240a search hit. If there is a CAM 240a hit, receive associated RAM 242a includes a context update select field that selects one of fifteen context update registers to determine how the control pipeline may be updated. If no update selection is provided, the fields remain unchanged.

During update operations of the control pipeline, values such as the following may be updated: SCT index, context pointer set, parser page select, VLAN select, VLAN, L3 select, and lookup count.

During update operations of the control pipeline, the next SCT index may be provided with a hit or miss value provided by the SCT RAM 316 based on the search of CAM 240a. Alternatively, receive associated RAM 242a data may provide the next SCT index.

During update operations of the control pipeline, the context pointer set may be incremented using control set in selected context update register. During update operations of the control pipeline, the parser page select, the VLAN select, and the L3 select may be incremented using a control flag in selected context update register.

During update operations of the control pipeline, the updated VLAN may be determined based on the updated Page and VLAN select fields. Alternatively, receive associated RAM 242a entry itself can supply the VLAN field, over-riding any parser 218 supplied VLANs. A flag is set in the control pipe when the receive associated RAM 242a entry itself supplies the VLAN field so that the value is not overwritten on subsequent receive packet engine 220 rotations, other than by further receive associated RAM 242a VLAN rewrite operations.

During update operations of the control pipeline, the lookup count is decreased by one.

v. Update Operations of AFH Pipeline

During update operations of the AFH pipeline, the following AFH data structures may be revised or created: (1) Port Tag index (PTI); (2) ingress QoS; (3) egress QoS; (4) CPU QoS; (5) egress mark command control; (6) transmit modification index (TXMI); (7) Link Aggregation Index (LAI); and (8) statistical sampling.

The PTI generated by packet addressor 112 is a sixteen-bit field, passed to the distributor 106 via the new AFH that is prepended to the ingress data packet. The upper address range addressed by the PTI field is used to access VLAN flood and multicast list start addresses in the distributor 106.

The PTI field is derived based on priority resolution of matching CAM 240a entries returning a valid PTI. The priority used in this process is resident in the SCT RAM 306. The other source of PTIs is exception handler processor 310. Along with a PTI for a given exception case, exception handler processor 310 also returns a priority field.

The final PTI is determined based on the highest returned priority. In the case of a tie, the first result is used. Exception handler processor 310 also provides the default PTI result in the case of no matching CAM 240a entry for a given type of lookup, for example, but not limited to, "MAC-Unknown" (in the case of a bridge forwarding operation). In addition, VPST dependence may apply (e.g., setting PTI to kill, based on a determination of the Spanning Tree State of the ingress virtual port). Those having ordinary skill in the art are familiar with the concept of "Spanning Tree State."

During update operations of the AFH pipeline, the ingress QoS field is processed as a generic data structure without special encodes. For a lookup in a sequence, SCT RAM 306 can dictate that 802.1p, MPLS or ToS QoS mapping is active. In addition to one of these three, ingress QoS may also be supplied by PST (or VST) and receive associated RAM 242a for a matching entry in CAM 240a. SCT RAM 306 provides a priority associated with receive associated RAM 242a resident QoS. A PST (or VST) resident field may be used to select a QoS priority control structure that may be one of sixteen. The QoS priority control structure indicates priority for PST, VST, 802.1p, MPLS and ToS Ingress QoS values.

The final ingress QoS is determined based on the highest returned priority. In the case of a tie, the first result is used. A receive associated RAM 242a select field is used to determine which MPLS QoS value is to be used in resolution process. In the case of MPLS parallel label processing, parallel QoS mappings are performed for all labels being processed.

During update operations of the AFH pipeline, the egress QoS may be implemented using one or more exclusive modes. The first mode implements egress QoS encodes using the lower values, for example MSB=0, to specify special QoS decisions. The special encodes may include, but are not limited to: (1) None; (2) Pre-emptive kill; (3) Normal kill; (4) Thermonuclear kill; (5) Egress mirror copy to mirror FIFO 250; (6) Pre-emptive intercept, to host CPU 206a; and (7) Normal intercept, to host CPU 206a. In addition, the resolution mechanism is similar to that for ingress QoS, using an independent set of resources.

During update operations of the AFH pipeline, the CPU QoS is processed as a generic data structure without special encodes. The resolution mechanism is similar to that for ingress QoS, using an independent set of resources. If the CPU QoS valid bit is set for any resource that "wins" the priority resolution, a copy of the packet is sent to the specified host processor 206a queue. This operation eliminates the need for a CPU QoS valid flag in addition to a CPU_Copy (CPU_Alert) flag.

During update operations of the AFH pipeline, the packet processor may create an egress mark set. The egress mark set may include a three-bit Egress Mark Select (EMS) and a three-bit Egress Mark Mask (EMM). The EMM may occupy the higher order bits while the EMS occupies the lower order bits.

The egress mark set may be provided by a PST element or a VST element from state tables 304b. The egress mark set may be provided by a receive associated RAM 242a entry for a matching CAM 240a entry. SCT RAM 306 provides a priority associated with the received associated RAM 242a resident value. A PST element or VST element resident field may be used to select a priority control structure from one of sixteen structures. The priority control structure indicates priority for PST, VST, 802.1p, MPLS and IPToS returned values.

The final egress mark set is determined based on the highest returned priority. In the case of a tie, the most recent result is used. In the case of MPLS parallel label processing, parallel QoS mappings are performed for all labels being processed, then the SCT field may be used to select which MPLS egress mark set value is to be used in resolution processing. An EMM setting of 0 (with EMS set as a don't care flag) is considered a special encode corresponding to no valid value present for the egress mark set.

During update operations of the AFH pipeline, the TXMI fields are processed as a generic data structure without special encodes. The TXMI field is derived based on priority resolution of those matching CAM 240a entries returning a valid TXMI. The priority used in this process is SCT RAM 306 resident. The final TXMI is determined based on the highest returned priority. In the case of a tie, the first result is used.

During update operations of the AFH pipeline, the LAI may be derived by a first method and by a second method. In a first method, a matching CAM 240a entry may provide the index using the LAI override function or this field may be accumulated across the lookup sequence using hash values from each. In a second method, the hash value is based on the key itself, with mask bits allowing SCT RAM 306 to switch off key nibbles that are not of interest for link aggregation.

The link aggregation hash may inherit the L4 invalidation performed on the key. SCT RAM 306 controls whether the hash from a given lookup replaces or is XOR'd into the working value. LAI replacement by matching CAM 240a entry may be persistent, unless subsequent matches wish to supply the same field, in which case they may be permitted to.

During update operations of the AFH pipeline, the statistical sample indication may be generated using a Linear Feedback Shift Register (LFSR) and counter structure. The PST/VST element provides a default sample bin select. The default may be overridden by any matching receive associated RAM 242*a* entry that also wants to provide the bin select. If multiple receive associated RAM 242*a* entries try to supply this field, then the highest bin value is used. A bin select value of 0 is used to encode a "no statistical sample" value for any given resource.

Generally, only one sample event is generated per packet lookup sequence. The winning bin select is used to access a Statistical Sample Control Table (SSCT). The SCCT may be included in packet engine 220. The SSCT table has seven entries corresponding to seven bins. The first field in the SSCT table is a LFSR threshold. The LFSR threshold is used to compare against a free-running sixteen-bit LFSR value. The LFSR threshold>LFSR current comparison result is used as the basis for creating a percentage sampling rate. A true result is used to increment a prescale counter value, which may be the second field in the SSCT table.

The third SSCT table field is another threshold, which is used to compare against the prescale counter value. If the Prescale Counter Threshold>Prescale Counter Current comparison is true then a statistical sample event is generated for inclusion in the revised AFH for the ingress data packet. This results in a copy of the ingress data packet being sent to the host processor 206*a*.

The Prescale Counter is then be cleared. Using a LFSR and a prescale counter structure in this manner means that a "sample every N" scheme can be used (per bin) as well as pre-scaling the basic percentage statistical sampling function. A further counter is used to record how many statistical sample events are generated per bin. This is the final field in the SSCT table.

vi. Update Operations of Statistics Pipeline

During update operations of the statistics pipeline, a matching entry index mode and a matrix index mode may be used. In the matching entry mode, a flag in receive associated RAM 242*a* data may be used to indicate that a statistics update should be executed using the matching CAM 240*a* address as the index. The statistics update event is generated immediately and written to the statistics update queue 320.

In the matrix mode, values obtained across multiple lookups are used to create a multi-dimensional structure for statistics updates. The matrix index values are updated using two sets of controls in the receive associated RAM 242*a* data and SCT RAM 306 data. Matrix index values are updated by taking a new index from the receive associated RAM 242*a* data, shifting it and masking it using SCT RAM 306 supplied controls and then performing a bit-wise OR using this quantity with the existing matrix value. If the SCT RAM 306 supplied mask field is zero for a given matrix construct, then the current matrix value is left unchanged. A flag for matrix indices is used in the statistics pipeline to determine whether any matrix updates have been performed and is used to correctly schedule statistics update queue 320 requests.

vii. Unload Operations

When the allocated packet lookup count has reached zero, the following operations are executed: (1) The revised AFH is written back to the receive FIFO 238 along with an AF_PKT_DONE indication to release the revised datagram to the internal network packet transfer device 204; and (2) The final statistics update data structure is written to the statistics update queue 320. The receive packet processor 316 is then ready to process another ingress data packet.

V. An Embodiment of Functions Associated with Receive Components

Figure 4:
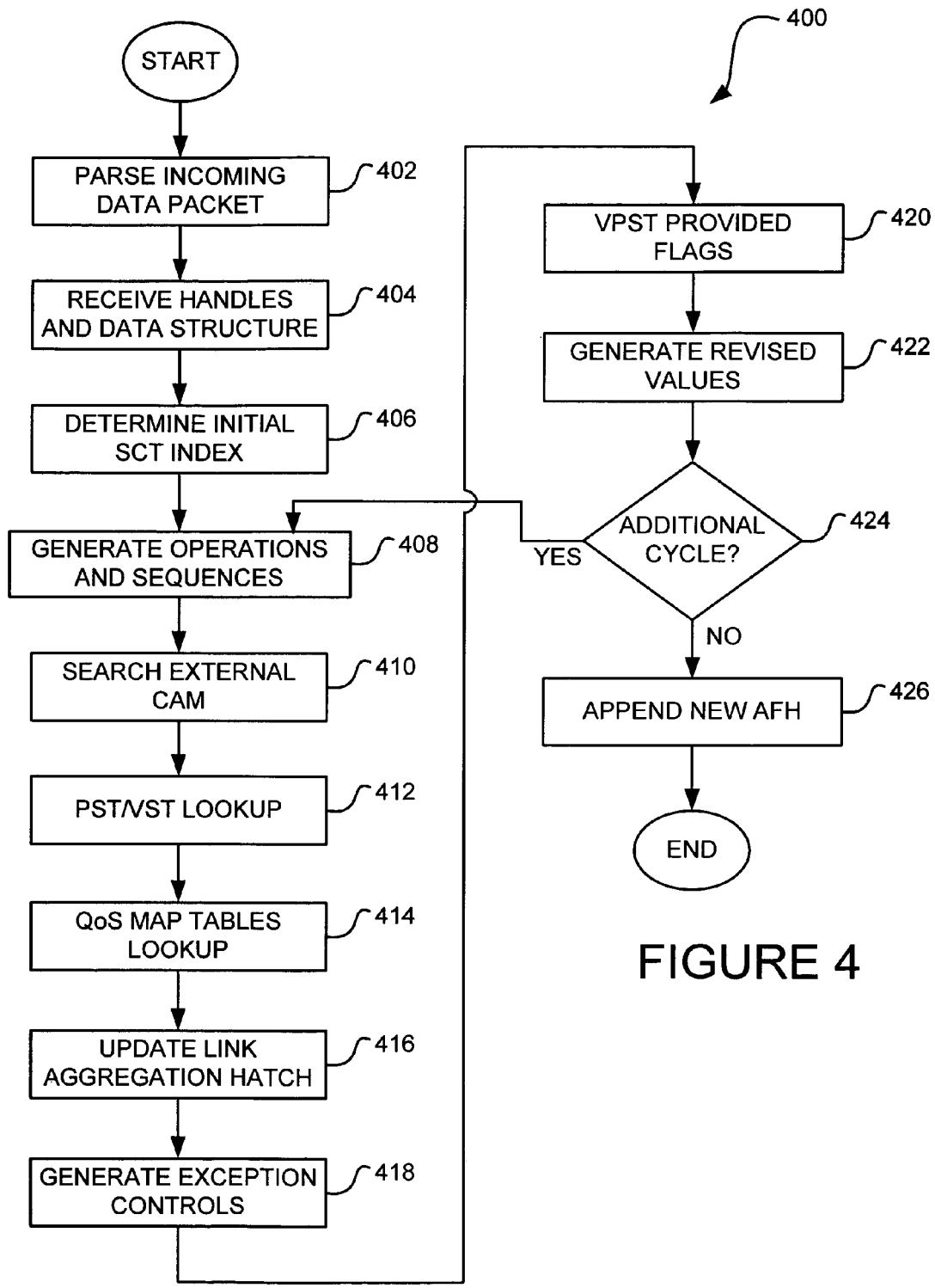
FIG. 4 shows a flowchart of an embodiment of the functions associated with the receive components of the packet addressor of FIG. 1.

FIG. 4 shows a flowchart of an embodiment 400 of the functions associated with receive components 112*a* of packet addressor 112 of FIG. 1. In block 402, an ingress data packet is provided by the external network receive interface 208. The ingress data packet may include packets such as but not limited to Ethernet, PoS Bridged and PoS Routed services. The ingress data packet is written into a memory element such as receive FIFO 238. The block 402 memory element may be a portion of receive ingress module 216. Receive packet parser 218, which in one embodiment is programmable, processes and decodes the various packet fields. Receive packet parser 218 generates various context pointer fields providing, for example but not limited to, L2, L3 & L4 frames of reference. Receive packet parser 218 also extracts the EtherType or LLC field. The MAC DA may be decoded to provide indicators such as, but not limited to, RADDR, multicast and broadcast indicators. In addition, receive packet parser 218 provides multiple VLAN extraction, IP Next Header processing and Transparent LAN Service (TLS) decode functions.

In block 404, a received packet indicator, indicating data residing in receive FIFO 238 requires processing, triggers the receive packet processor 316 to place the received packet indicators into an in progress stack. Receive FIFO 238 provides the receive packet processor 316 with the following data associated with the ingress data packet: (1) a packet handle—for example a pointer; (2) a statistics handle—for example a pointer; and (3) the data structure provided by receive packet parser 218. The packet handle, statistics handle, and the parser data structure are used to access and track packet data and control structures that are exchanged across the receive FIFO 238 interface (not shown).

In block 406, first command CAM 302 is searched to determine the initial SCT index. The initial SCT index is an initial search sequence starting address pointer for the SCT RAM 306. The first command CAM 302 is searched using the data packet fields and flags, for example but not limited to an EtherType/LLC/PPID field along with flags for Router Address Match, Multicast Address Match and IP Protocol. The highest matching first command CAM 302 entry provides the initial SCT index. In the case of a routed PoS service, the first command CAM 302 may also provide an associated ingress VLAN.

In blocks 408 through 422, a predetermined number of processing operations are performed on the ingress data packet. The predetermined number of operations performed is fixed, but programmable, while the sequence of the operations is also programmable. The number of cycles that blocks 408 through 422 are performed is also programmable. Block 410 through 420 are executed in parallel, and controlled by SCT RAM 306 resident fields and also may be the result of previous receive packet engine 220 operations.

In block 408, the SCT RAM 306 programs the type of operations performed and the sequence of the operations. The initial SCT index from block 406 is used to perform the first access to the SCT RAM 306. The fields in the SCT "data word" control how the receive packet engine 220 will execute and process the search operation of CAM 240*a*. The fields in the SCT entry also control the auxiliary concurrent processing operations as described below.

In block 410, CAM 240*a* is searched. The key for CAM 240*a* is generated using context and offset data provided by receive parser 218 for the ingress data packet. The key for CAM 240*a* may include derived (mapped) data and control data associated with the ingress data packet. The derived data and control data are not part of the packet data itself. Generating the derived data and control data may include the use of reduction map tables 314, for example four reduction map tables, for handling data such as, but not limited to, sparse packet state spaces, router identification fields, and entry-typing bits. The entry-typing bits allow coexistent entry types in a single CAM 240a block. A CAM 240a lookup hit returns a data structure that is stored in receive associated RAM 242a. CAM 240a lookup misses do not return any associated data.

In block 412, Port State Table (PST)/VLAN State Table (VST) lookup, within state tables 304b, provide control fields for internal network receive interface 210. The control fields include, but are not limited to PST/VST active selection, PST/VST based QoS, and a Router ID field. The PST/VST lookup also determines which of the available QoS schemes (for example there may be sixteen QoS priority segments and QoS mapping segments) is to be used for the current cycle.

In block 414, QoS map table 312 lookups provide QoS values derived from, for example but not limited to, 802.1p, MPLS (EXP), IP v4 ToS, IP v6 traffic class, and IPv6 flow label based QoS. The number of fields QoS mapped in any given lookup is limited to one.

In block 416, the link aggregation hash is updated based on key data and mask. The incremental hash update process provides ignore, XOR or replace operations.

In block 418, an exception handler set, from exception handlers processor 310, provides a range of L2, L3 and L4 exception controls, for several well-known services, including but not limited to IP v4 Unicast/Multicast, and IP v6 Unicast/Multicast. Exception handlers processor 310 provides the Port Tag Index (PTI) and a priority for resolution by receive packet processor 316. The PTI and a priority for resolution are used to derive the default decision for packet forwarding. The L2 exception handler allows direct generation of a VLAN flood list start PTI. Fragment offset and protocol fields may be used to qualify L4 validity in the key for CAM 240a and the link aggregation generation functions.

In block 420, a VPST, for example a VPST in state tables 304b, may be accessed to provide flags, such as but not limited to forward, learn, mirror, and noroute.

In block 422, receive packet processor 316 resolves the data structures input into the processor 316. Processor 316 provides a revised AFH from the lookup cycle. Priority resolution is utilized to update fields within the revised AFH such as PTI, QoS and TXMI. Other fields, such as but not limited to Learn and Redirect (AF-Flags) may also be generated. Processor 316 also provides on data path 360 (FIG. 3) an updated statistics control structure using masked shift and OR operations on SCT RAM 306 and associated RAM 242a resident fields. Processor 316 also provides a next SCT index on data path 359 (FIG. 3) based on a CAM 240a hit, miss or matching entry override. Context pointers may be incremented based on matching entry, allowing the packet engine 220 to change the frame of reference of data selection operations from one cycle to the next. In the case of a CAM 240a miss, no associated RAM 242a data takes part in the updating of the revised AFH field.

Lookup operations described above are able to define their own control data set, for example exception handler selection. Self-defining control data sets allows processing of constructs including, but not limited to MPLS-IPv4, MPLS-IPv6, IPv4-IPv4, and IPv4-IPv6.

In block 424, receive packet processor 316 determines whether an additional cycle will be performed. If an additional cycle will be performed, packet addressor 112 returns to block 408. If an additional cycle will not be performed, the packet addressor 112 moves to block 426.

In block 426, the new AFH structure is passed back to the receive FIFO 238 using the packet handle. The receive FIFO 238 releases the ingress data packet to the internal network receive interface 210, via the receive egress module 222. The statistics control structure on data path 360 is passed to Statistics Update Queue (SUQ) 320, using the statistics handle, for reconciliation with the End-of-Packet event before being passed to the statistics processing block 322 and eventually being used to revise statistics RAM 244a. In some embodiments, the statistics control structure on data path 360 is passed to the Statistics Update Queue (SUQ) 320 with the generation of revised AFH fields, even if the revised AFH field does not become the new AFH field.

VI. An Embodiment of Classification Data

FIG. 5 illustrates the format of classification data 500 for a packet as produced by one embodiment of packet addressor 112 of FIG. 1. Classification data 500 in this embodiment has first and second portions, identified respectively with numerals 502 and 504. First portion 502 is a 64-bit address field header (AFH) that is pre-pended to the packet. The second portion 504 is a 20-bit grouping of flags that are encoded as control bits maintained by packet addressor 112.

In one embodiment, the Port Tag Index (PTI) field is an identifier of the port, or plurality of ports, to which the packet should be sent by distributor 106.

The Egress Quality of Service (EQoS) field may be used to perform an egress queue selection function in a device encountering the packet. In one embodiment, this field also encodes one of the following functions: nothing; pre-emptive kill; normal kill; thermonuclear kill; egress mirror copy; pre-emptive intercept to host; and normal intercept to host.

The Link Aggregation Index (LAI) field may be used to implement physical link selection, ingress alias, echo kill alias, or equal cost multi-path functions in a device encountering the packet.

The JUMBO flag, if asserted, directs a device encountering the packet to perform a JUMBO-allowed check. In one embodiment, the flag is used to implement the policy that the only valid JUMBO packets are IP packets. Therefore, if the packet is a non-IP JUMBO packet, the device may either send it to a host, fragments it, or kills it.

The DON'T FRAG flag, if asserted, directs a device encountering the packet not to fragment it in the course of implementing a JUMBO-allowed check.

The IF TYPE flag indicates whether the ingress interface over which the packet was received is an Ethernet or Packet Over Sonet (POS) interface.

The ROUTE flag, if asserted, indicates that the packet is being bridged not routed, and may be used by devices encountering the packet to implement an echo kill suppress function.

The RANDOM EARLY DROP (RED) flag may be used to implement a random early drop function in devices encountering the packet.

The CTL flag indicates the format of the new AFH header. FIG. 5 illustrates the format of the header for packets exiting packet addressor 112 and destined for internal network 104 after exiting distributor 106. Another format may apply for packets exiting internal network 104 and destined for the packet addresser 112. The CTL flag indicates which of these two formats is applicable.

The Transmit Modification Index (TXMI) field is used by modification engine 228 to retrieve control and data structures from transmit modification RAM 246a for use in performing any necessary modifications to the packet.

The CPU Quality of Service (CQoS) field may be used to perform an ingress queue select function in a host processor 206a.

In one embodiment, the CPU Copy flag, if asserted, directs one or more devices that encounter the packet after processing by the receive components 112a to is forward a copy of the packet to host processor 206a. In another embodiment, the CPU Copy flag, if asserted, directs a copy of a packet to be forwarded to another processor.

The Redirect flag, if asserted, directs one or more devices that encounter the packet after processing by the receive components 112a to forward a copy of the packet to host processor 206a for redirect processing.

The Statistical Sample (SSAMPLE) flag, if asserted, indicates to one or more devices that encounter the packet after processing by the receive components 112a that the packet is a candidate for statistical sampling. If the packet is ultimately selected for statistical sampling, a copy of the packet is directed to host processor 206a, which performs a statistical analysis of the packet for the purpose of accurately characterizing the network traffic of which the packet is a part.

The LEARN flag, if asserted, directs one or more of the devices that encounter the packet after processing by the receive components 112a to forward a copy of the packet to host processor 206a so the host processor 206a can perform learn processing. In learn processing, host processor 206a analyzes the packet to. "learn" the sender's MAC address for future packet switching of packets to that address.

The Egress Mirror (EMIRROR) flag, if asserted, implements egress mirroring by directing one or more of the devices that encounter the packet after processing by the receive components 112a to send a copy of the packet to mirror FIFO 250. From mirror FIFO 250, the packet passes through the receive egress module 222 of packet addresser 112 in route to one or more internal network 104 devices.

The Ingress Quality of Service (IQoS) field may be used to perform an ingress queue selection function in a device encountering the packet.

The Egress Mark Select (EMRK SEL) field selects one of several possible egress mark select (EMS) functions. The Egress Mask (EMRK MASK) field selects one of several possible egress mark masks (EMM). Together, the EMRK SEL and EMRK MASK fields form an egress mark set which may be used by packet marker 232 to mark the packet, i.e., selectively modify one or more QoS fields within the packet.

The Ingress Mirror (IMIRROR) flag, if asserted, directs one or more of the devices that encounter the packet after processing by the receive components 112a to forward a copy of the packet to an ingress mirror FIFO (not shown).

The Parity Error Kill (PERR KILL) flag, if asserted, directs internal network receive interface 210 to kill the packet due to detection of a receive associated RAM 242a parity error.

In one embodiment, the EMIRROR bit is normally in an unasserted state. If packet addresser 112, after analyzing the packet, determines that egress mirroring of the packet is appropriate, the packet addresser 112 changes the state of the EMIRROR bit to place it in the asserted state.

The packet, along with the pre-pended new AFH header containing the EMIRROR bit, is then forwarded to the one or more devices that encounter the packet after processing by the receive components 112a. After processing the packet, the one or more devices transmit the packet, with the EMIRROR bit preserved in a pre-pended packet header, back to the packet addresser 112 over internal network transmit interface 212. In response, the packet addresser 112 is configured to detect the state of the EMIRROR bit to determine if egress mirroring of the modified packet is activated, and if so, provide a copy of the modified packet to the receive egress module 222 through mirror FIFO 250.

In one embodiment, the EQoS, CQoS, IQoS, EMRK SEL and EMRK MASK fields define a multi-dimensional quality of service indicator for the packet. In this embodiment, the EMRK SEL and EMRK MASK fields form packet egress marking control information that is utilized by packet marker 232 to selectively modify one or more quality of service fields within the packet, or a packet derived therefrom.

The quality of service indicator for a packet may be derived from a plurality of candidate quality of service indicators derived from diverse sources. In one embodiment, a plurality of candidate quality of service indicators are derived for a packet, each with an assigned priority, and a configurable priority resolution scheme is utilized to select one of the plurality of quality of service indicators for assigning to the packet. In one embodiment, one or more of the candidate quality of service indicators, and associated priorities, are derived by mapping one or more fields of the packet into one or more candidate quality of service indicators for the packet and associated priorities. In a second embodiment, one or more searches are conducted to obtain one or more candidate quality of service indicators for the packet and associated priorities. In a third embodiment, a combination of these two approaches is utilized.

In one example, candidate quality of service indicators, and associated priorities, are derived from three sources. The first is a VLAN mapping scheme in which a VLAN from the packet is mapped into a candidate quality of service indicator and associated priority using a VLAN state table (VST), such as a VST within state stables 304b. The VLAN from the packet may represent a subnet or traffic type, and the associated priority may vary based on the subnet or traffic type. The second is a CAM-based search, such as CAM 240a, which yields an associated ARAM, such as receive associated RAM 242a, entry that in turn yields a candidate quality of service indicator. A field of an entry in a Sequence Control Table (SCT) RAM, such as SCT RAM 306, which provides the sequence of commands controlling the operation of one embodiment of receive packet engine 220, provides the associated priority. The third is a QoS mapping scheme, which operates in one of three modes, as determined by a field in a SCT RAM, such as SCT RAM 306, entry.

In the first mode, the 802.1p mapping mode, the VST provides the four QSEGment bits. The QSEG and the 802.1p bits are mapped into a candidate quality of service indicator, and the VLAN itself is mapped into an associated priority using the VST. In the second mode, the MPLS mapping mode, the EXP/QOS fields from the packet are mapped into a candidate quality of service indicator, and a VLAN from the packet is mapped into the associated priority using the VST. In the third mode, the ToS mapping mode, the IPv4ToS, IPv6 Traffic Class, or Ipv6 Flow Label based QoS fields are mapped into a candidate quality of service indicator, and a VLAN from the packet is mapped into an associated priority using the state tables 304b VST.

In this example, the candidate quality of service indicator with the highest priority is assigned to the packet. Moreover, a candidate from one of the sources can be established as the default, which may be overridden by a candidate obtained from one of the other sources, at least a candidate which has a higher priority than the default selection. For example, the candidate quality of service indicator resulting from the 802.1p mapping mode can be established as the default selection, and this default overridden only by a candidate quality of service indicator resulting from a receive associated RAM 242a entry in turn resulting from a CAM 240a based search.

VII. Additional Embodiments of Packet Addressor 112

FIG. 6 illustrates an embodiment 600 of a packet addressor 112 of FIG. 1. In this embodiment, packet addressor 112 is coupled to one or more network-side devices through a multi-port packet bus (PBUS) 602, as described in U.S. patent application Ser. Nos. 10/405,960 and 10/405,961, filed Apr. 1, 2003, which are both hereby fully incorporated herein by reference. PBUS ingress logic 604 is configured to detect a start of packet (SOP) condition for packets arriving at packet addressor 112 over PBUS 602.

Upon or after detection of the SOP condition, the packet, or a portion thereof, is stored in a slicer 606. Slicer 606 is configured to slice some or all of a packet into portions and provide the portions in parallel over first data path 608 having a first width to classification engine 610. In one embodiment, the slicer 606 is a FIFO which stores the first 128 bytes of a packet (or the entirety of the packet if less than 128 bytes), and provides the 1024 bits thereof in parallel to the packet classification engine 610 over the first data path 608.

Upon or after detection of the SOP condition, parser 612 parses the packet in the manner described previously and stores the resultant context pointers (and other flags resulting from the parsing process) in parser result RAM 614. Concurrently with this parsing process, the packet is stored in buffer 618, which in one embodiment, is a FIFO buffer.

The packet classification engine 610 is configured to classify the packet responsive to the packet portions received over the first data path 608 and the parser results as stored in the parser result RAM 614, and store data representative of the packet classification in classification RAM 616. In one embodiment, the classification data is the AF header illustrated in FIG. 5.

An associator 620 is configured to associate the data representative of the packet classification with some or all of the packet, and provide the associated packet over a second data path 622 having a second width less than the first width.

The packet addressor 112 is coupled to one or more switch-side devices over a multi-port PBUS 626, and PBUS egress logic 625 is configured to transmit the associated packet over the PBUS 626.

In one embodiment, slicer 606 comprises a plurality of memories configured to store some or all of the packet, and provide the portions thereof in parallel over the first data path 608 to the classification engine 610. In one example, the slicer 606 is configured as eight (8) memories configured to provide the first 1024 bits of the bits of the packet (or less if the packet is less than 128 bytes) in parallel over the first data path 608 to classification engine 610.

In one embodiment, the associator 620 comprises a multiplexor configured to multiplex onto the second data path 622 the data representative of the packet classification as stored in classification RAM 616 and some or all of the packet as stored in buffer 618. In one implementation, the multiplexor multiplexes the first 8 byte portion 202 of the AF data illustrated in FIG. 2 (which may be referred to as the AF header) onto the second data path followed by the packet as stored in buffer 618, thereby effectively pre-pending the AF header to the packet. In this implementation, control logic 628 controls the operation of the multiplexor through one or more signals provided over control data path 634.

More specifically, the multiplexor in this implementation is configured to select one of three inputs and output the selected input to the second data path 622 under the control of the control logic 628. The first input is the classification data as stored in classification RAM 616. The second input is the packet as stored in buffer 618. The third input is the output of mirror FIFO 250. This third input is selected when the egress mirroring function, discussed previously, is activated.

In one embodiment, the control logic 628 is also configured to maintain first and second stacks, identified respectively with numerals 630 and 632, the first stack 630 for identifying those packets which are awaiting classification by the packet addressor 112, and the second stack 632 for identifying those packets which are undergoing classification by the classification system.

In this embodiment, the control logic 628 is configured to place an identifier of a packet on the first stack 630 upon or after receipt of the packet by the packet addressor 112, pop the identifier off the first stack 630 and place it on the second stack 632 upon or after initiation of classification processing of the packet by the packet addressor 112, and pop the identifier off the second stack 632 upon or after completion of classification processing of the packet by the packet addressor 112.

The control logic 628 is configured to prevent the packet addressor 112 from outputting a packet onto PBUS 626 while an identifier of the same is placed on either the first or second stacks 630, 632, and allows the packet addressor 112 to output the packet onto PBUS 626 upon or after the identifier of the packet has been popped off the second stack 632. In one implementation, the control logic 628 prevents the associator 620 from outputting data on the second data path 622 through one or more signals provided over control data path 634. In one implementation, the control logic 628 is a state machine.

In one embodiment, the control logic 628 forms the basis of a packet statistics maintaining system within the packet addressor 112. In this embodiment, the control logic 628 is configured to maintain a pool of packet size determiners, and allocate a packet size determiner to a packet from the pool upon or after receipt thereof by the packet addressor 112.

In one implementation, the control logic 628 allocates a packet size determiner to a packet upon or after the PBUS ingress logic 604 signals a SOP condition for the packet. The packet size determiner is configured to determine the size of the packet, and the control logic 628 is configured to return the packet size determiner to the pool upon or after the same has determined the size of the packet. In one implementation example, the packet size determiners are counters.

Receive statistics RAM 244a in this embodiment maintains packet statistics, and statistics update logic 636 is configured to update the packet statistics responsive to the determined size of the packet. In one implementation, the statistics update logic 636 includes a queue for queuing statistics update requests issued by the control logic 628.

VIII. Description of Transmit Components

Figure 7A:
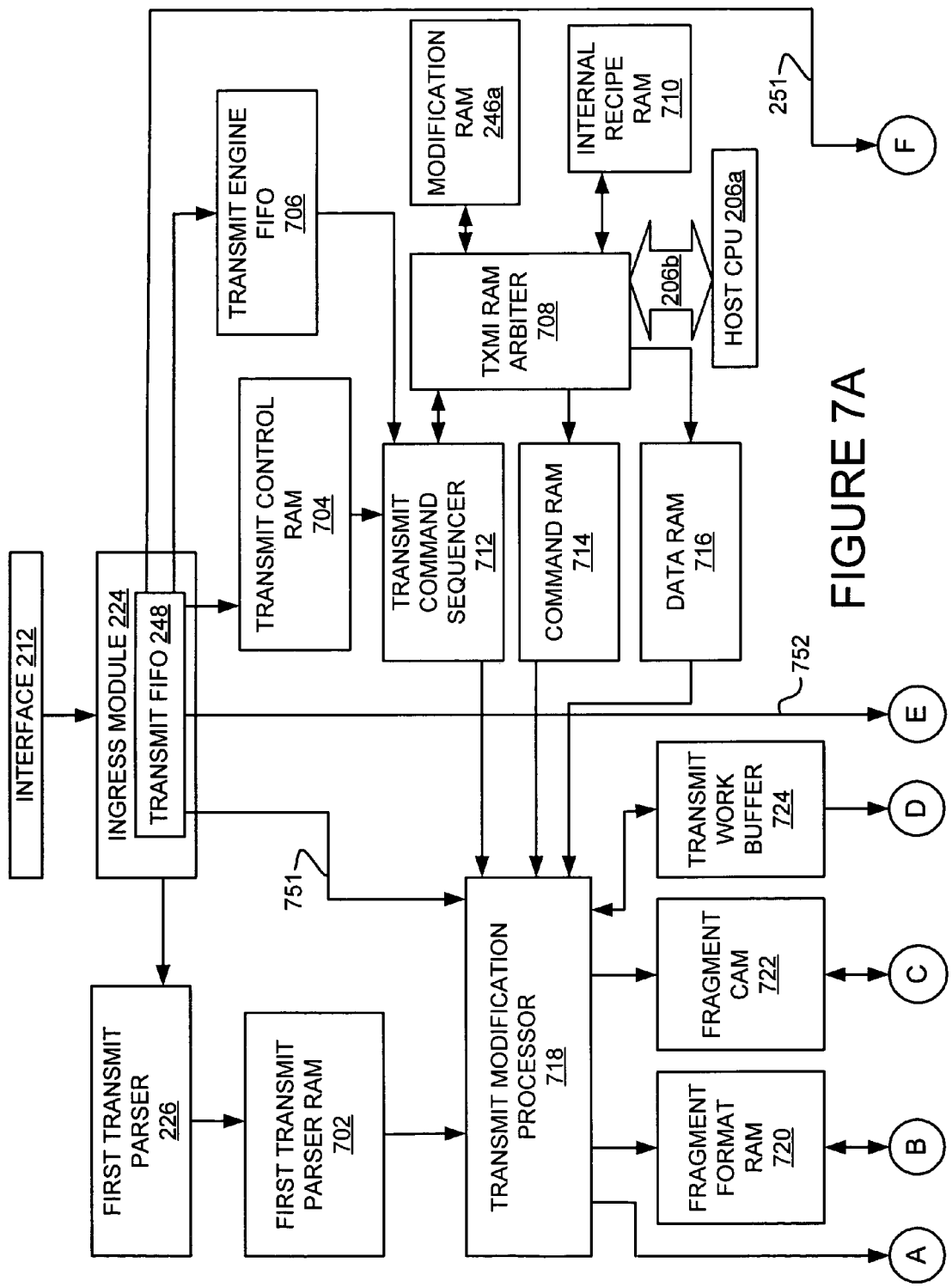

FIGS. 7A and 7B show a block diagram of one embodiment of some of the transmit components 112b of packet processor 112 of FIG. 1. FIGS. 7A and 7B show internal network transmit interface 212, transmit ingress module 224, transmit FIFO 248, first transmit parser 226, transmit modification RAM 246a, host processor interface 206b, second transmit parser 230, packet marker 232, transmit ACL 234, transmit egress module 236, egress mirror FIFO 250, and external network transmit interface 214.

Modification engine 228 of FIG. 2 includes first transmit parser RAM 702, transmit control RAM 704, transmit engine FIFO 706, TXMI RAM arbiter 708, internal recipe RAM 710, transmit command sequencer 712, command RAM 714, transmit data RAM 716, transmit modification processor 718, fragment format RAM 720, fragment CAM 722, transmit work buffer 724, fragment processor 726, transmit burst processor 728, assembler 730, and second transmit parser RAM 732.

FIGS. 7A and 7B show that packet marker 232 of FIG. 2 includes packet marker processor 232a, transmit post processor RAM 232b, and transmit state table map RAMs 232c. FIGS. 7A and 7B also show that transmit ACL 232 of FIG. 2 includes transmit ACL processor 234a, and transmit ACL CAM 234b.

Transmit path components 112b (FIG. 2) of packet addresser 112 (FIG. 1) provide a programmable system and method for altering egress data packets in order to perform packet modification functions, such as but not limited to: (1) Next hop MAC DA replacement; (2) Next hop VLAN ID replacement; (3) Source address insertion; (4) TTL decrement; (5) MPLS stack single entry add and delete; (6) MPLS stack double entry add and delete; (7) MPLS label change; (8) MPLS TTL decrement; (9) MPLS TTL copy; (10) MPLS Ethertype replace and restore; (11) IPv4/IPv6 encapsulate and de-encapsulate; and (12) IP TOS, VPRI or EXP modification.

Egress data packets or egress datagrams are received by ingress module 224 from the internal network transmit conduit 212. An egress data packet is written into an entry in a buffer, such as transmit FIFO 248. In order to prevent packet re-ordering, the egress data packet will be assigned a packet buffer as well as a sequence number. The sequence numbers are assigned in monotonic order as packets arrive in to transmit FIFO 248 so that they can be released back into networks in the same order as they arrived. The buffer holding the entry will generally be freed only after the modified egress data packets or egress datagram have left packet addresser 112 whereas the sequence number will continually wrap.

As transmit modification processor 718 bandwidth is available, TXMIs associated with an egress data packet are accessed by transmit modification processor 718 to execute a transmission modification recipe to revise the egress data packet and to create a fragment buffer identifying fragments of original egress data and/or modified egress data fragments. The fragment buffer may contain a list of fragments of egress packet data stored in transmit FIFO 248 and/or transmit work buffer 724 which can be utilized by transmit burst processor 728 to construct and transmit revised egress data packets to second transmit parser 230. After parsing, the revised egress data packets are then provided to transmit ACL 234 and packet marker 232 in parallel. Packet marker processor 232a may recalculate the revised egress data packet header checksums and revise the VPRI, EXP, and IP TOS bits before sending the modified egress data packets on to the external network transmit conduit 214 via the transmit egress module 236.

Transmit ACL 234 may flag the modified egress data packets to be killed based on data provided by transmit Access Control List (ACL) CAM 234b. Transmit ACL CAM 234b is implemented as an internal 242×152 CAM, where all CAM hits and misses are counted. Transmit ACL 234 may also generate an egress mirror of the modified egress data packet and send the modified egress data packet to egress mirror FIFO 250. Egress data packets may also bypass many of the transmission components 112b via data path 251.

A. Transmit FIFO Memory Element 248

Transmit FIFO memory element 248 stores egress data packets such that original egress packet data can be passed in parallel over a data path 751 having a first width to transmit modification processor 718. In one implementation, transmit FIFO 248 comprises a plurality of FIFOs, with the outputs of the FIFOs coupled in parallel to transmit modification processor 718 and collectively forming data path 751. Incoming packet or packet bursts are copied into each of the plurality of FIFOs, thereby providing transmit modification processor 718 with varied widths of the unmodified egress data in parallel. For example, but not limited to, egress packet data widths may be 64, 128, and 192 bits of data.

B. First Transmit Parser 226

Before the egress data packets arrive at the transmit modification processor 718, the first transmit parser 226 identifies some OSI layer boundaries within the egress data packet. The identified OSI layer boundaries are referred to as contexts. Contexts are addressed on byte boundaries. Contexts such as, but not limited to, the following seven may be identified: (1) C0(NULL) The first byte of the egress data packet including the AFH; (2) C1(L2) The start of the MAC header; (3) C2(Ethertype) The start of the Ethertype field (if present); (4) C3(MPLS) The start of the MPLS header(s) (if present); (5) C4(L3 Outer) The start of the outer L3 header; (6) C5(L3 Inner) The start of the inner L3 header; and (7) C6(L4) The start of the TCP/UDP Header.

For all egress data packet modifications requiring the use of original egress data packet data, the modification command contains a context and an offset, which are added together to generate the location in the egress data packet of the source data. Adding the context from first transmit parser 226 plus the offset also generates the destination address for all transmit modification processor 718 commands. This allows transmit modification recipes to be packet protocol independent, which allows for the generic use of transmit modification recipes.

C. Transmit Modifier Index Pointer and Transmit Link

The TXMI pointer points to an entry in the modification RAM 246a that contains either an internal transmit link or an external transmit link. As egress data packets arrive, TXMI RAM arbiter 708 receives a TXMI pointer from transmit control RAM 704 via transmit command sequencer 712. The TXMI pointer is a twenty-bit address into external transmit modification RAM 246a pointing to the transmit modification recipe link.

In one embodiment, the transmit recipe link is a bi-modal 72-bit data structure pointing to either: (1) an internal command set and external data; (2) or an external command set and external data. The internal/external recipe link semaphore (bit 70) determines the type of transmit link data structure, either an internal or and external recipe link.

An internal recipe link includes a pointer to burst addresses of commands located in internal recipe RAM 710, the command burst lengths, and two pointers to external data set located in the external transmit modification RAM 246a.

For external recipe links, there are three sets of burst addresses, lengths for external commands, and two data sets. The first burst address and burst length is for an external command set. The external command set is also stored in external transmit modification RAM 246a. The second and third burst addresses and burst lengths are for external data sets located in external transmit modification RAM 246a.

A burst length of zero is defined to mean that there are no commands or data at that corresponding burst address. TXMI RAM arbiter 708 schedules accesses into external transmit modification RAM 246a with first priority going to any transmit link requests, second priority going to any transmit commands or data burst requests and last priority for host processor 206a access.

In one embodiment, the transmit link structure for internal command sets and associated external data sets has an addressable limit of 2k for internal commands from internal recipe RAM 710 and 1M entries for external data from external transmit modification RAM 246a. However, those having ordinary skill in the art can create different modes of a TXMI link with varying sizes to achieve a particular design goal.

The transmit link structure for external command sets and associated external data sets, has an addressable limit of 256k for transmit commands from external transmit modification RAM 246a and 1M entries for external data from external transmit modification RAM 246a.

D. Internal Recipe RAM 710

Internal recipe RAM 710 may be utilized for storing on-chip transmit modification recipes. In one embodiment, internal recipe RAM 710 is a 1kx72 RAM, which contains blocks of transmit modification commands. Because the TXMI link has provision for different command and data/mask set, a single unique recipe of transmit modification commands can be reused to modify many packets the same way but with different data. The data/mask set may reside off-chip in the external transmit modification RAM 246a. In one embodiment, the internal transmit link contains an eleven-bit internal recipe index. The internal recipe index is the beginning address for internal recipe RAM 710 and the TXMI link will contain the number of addresses that contain valid commands. Internal recipe RAM 710 contains two 34-bit transmit commands as well as a valid bit to determine if the most significant transmit modification recipe is valid. Since the internal transmit link only returns the number of lines in the internal recipe RAM 710 which contain valid transmit modification recipes, the most significant command valid bit is set for transmit modification recipes with an even number of command(s). Each internal recipe index pointer also may be aligned on a 72-bit boundary, so operation code packing is not possible. The two sets of data and mask bits are packed and stored in external transmit modification RAM 246a and these are burst read into a burst read and concatenated to build up one set of data/masks. The data and mask bit preferably begins on a 64-bit word address alignment. An internal recipe index of 0 is reserved to indicate that there is no internal transmit modification recipe.

E. Transmit Modification RAM 246a

External transmit modification RAM 246a may be utilized for storing transmit modification commands and associated data. If all of the transmit modification commands can fit within internal recipe RAM 710, then external transmit modification RAM 246a is only required to store associated data and mask. However, it is possible to program the modification engine 228 for a mixture of both internal transmit modification commands and external transmit modification commands. The external transmit modification RAM 246a includes transmit modification commands and packet data and masks. All external transmit modification commands must begin on 72-bit boundaries. The transmit modification recipe may contain up to 32 entries of transmit modification commands (sixteen lines of RAM) and up to 64 entries of associated data/mask. However, transmit modification recipes longer than ten modification commands have the potential to cause a head of line blocking on subsequent egress data packets. This is possible because longer transmit modification recipe lists will consume available transmit modification processor 718 bandwidth for other egress data packets. However, it is may be possible to have a transmit modification recipe longer than ten transmit modification commands and not affect the system bandwidth, but this will depend upon the makeup of the traffic and how often the longer transmit modification recipe is called for packet modification.

Transmit modification RAM 246a may include two data and mask sets where either data set 0 or data set 1 contains no entries. The software may allocate the data and masks in the external transmit modification RAM 246a in the most optimal configuration. All data and mask fields are packed into the data sets and the data sets are stored LSB first. Data precedes mask fields and they both contain the number of bytes specified by the length field. Using seven-bit offset fields allows modification operations anywhere within the first 128 bytes of the egress data packet header. All constructs are executed in the order in which they are parsed. Preferably, the associated data and mask is not split over two data sets. Instead, all of the data and masks for a given command instruction reside entirely inside data set 0 or data set 1.

F. Transmit Modification Commands

Transmit modification commands are designed to perform data manipulations on an egress data packet. Transmit engine 228 modifies the egress data packet based on a view on how the egress data packet is going to look when it leaves packet addresser 112. A block of transmit modification commands to perform an egress data packet modification is referred to as a transmit modification recipe.

Transmit modification recipes can use as source data, data from the egress data packet from the first 128 bytes of the pre-modified egress data packet, and transmit modification recipes can use data supplied from transmit modification RAM 246a in order to create the modified egress data packet. The transmit modification commands preferably are coded and ordered in a sequence that modifies the egress data packet on monotonically increasing byte output order for the egress data packet. For example, if a transmit modification recipe is required to modify bytes 0-5 of context 1, and byte 5 of context 4, the transmit modification commands must be ordered so that the modification of context1, bytes 0-5 is done first followed by the context 4, byte 5. Modification engine 228 can process one transmit modification command per clock and modification engine 228 may have a maximum storage limit of modification commands per transmit modification recipe.

Transmit modification commands may contain eight fields including, but not limited to: (1) data length; (2) page; (3) context for source; (4) context for destination; (5) offset for source; (6) offset for destination; and (7) the command instruction. The data length field is a byte count pertaining to the size of the operation.

The command instruction can be, but is not limited to: nop, insert, delete, replace, replace_mask, copy, copy_mask, tx_acl, emc_vpri, emc_iptos, or an ALU insert or an ALU replace command. Transmit modification commands operate on up to 64-bits of the egress data packet at a time except for the mask commands which can only operate on 32-bits of data.

The transmit ACL (tx_acl) commands are designed to pass the VPORT and index control information from the transmit modification recipe to the transmit ACL 234 for ACL processing.

Egress Mark Commands (EMC) are configured to pass egress mark commands to packet marker 232.

G. Transmit Modification Processor 718

Transmit modification processor 718 may be understood as a 128-bit six-stage data path processor. Transmit modification processor 718 can perform Arithmetic Logic Unit (ALU) functions and other data manipulation processing functions on up to eight bytes of egress data packet data in the first 120 bytes of egress data packet entering the transmit modification processor 718.

Modification processor 718 can perform functions, such as but not limited to: (1) Deleting bytes from the packet header—a one transmit command for any block size where a length of zero means to delete an entire context; (2) Inserting up to 32 bits of data into the packet header—one transmit command with 32 bits of data; (3) Replacing up to 32 bits of data in the packet header—one transmit command with 32 bits of data; (4) Copying up to 32 bits of data from the packet header to another place in the packet header—one transmit command with 32 bits of data; and (5) ALU functions on up to 32 bits of data in the packet header—one transmit command with 32 bits of data.

Transmit modification processor 718 will process up to six different egress data packets concurrently until the command set has been exhausted and then it passes revised packet fragments to transmit work buffer 724 and then it will work on the next egress data packet.

Packets per second through modification processor 718 may be calculated based on the transmit modification recipe size and data block copied, inserted, or replaced. In order to calculate the packets per second, divide the clock frequency by the number of entries (plus one for the link) and number of 32-bit block manipulations. In the case of a 167 MHz clock, a transmit modification recipe with ten entries per block manipulations and one link yields 16.7 Mpps.

H. Transmit Modification Processor 718 Errors

Several errors can occur during the modification of egress data packets. Maskable error flags can generate a host processor 206a interrupt or signal transmit burst processor 728 to set the reject bit in the egress data packet to have the MAC count and kill the egress data packet.

Maskable error flags include: (0) ALU and copy commands>packet size—flag packet to be killed; (1) Destination address is ahead of current read pointer—flag packet to be killed; (2) ALU and copy commands>packet size—flag packet to be killed; (3) Reserved N/A; (4) Context 1<Context 0—flag packet to be killed; (6) Context 2<Context 1—flag packet to be killed; (7) Context 3<Context 2—flag packet to be killed; (8) Context 4<Context 3—flag packet to be killed; (9) Context 5<Context 4—flag packet; (10) Context 6<Context 5—flag packet; (11) TTL<limit or TC>limit—flag packet to be killed; (12) Transmit FIFO 248 parity error—flag packet to be killed; (13) Transmit work buffer 724 parity error—flag packet to be killed; (14) RAM 246a or internal recipe RAM 710 parity error—flag packet to be killed; (15) Packet modification>0x80—flag packet to be killed.

I. Fragment Burst Processor 726

After transmit modification processor 718 completes the recipe command set, a single entry is written into fragment CAM 722 at an address associated with the fragment buffer identifier for format RAM 720. Fragment CAM 722 entries contain a packet kill flag, EOP flag, packet offset, work buffer length, SOP pointer, sub-channel and sequence number. The fragment burst processor 726 block searches fragment CAM 722 for the next sub-channel sequence number to process, which prevents packet re-ordering. Fragment processor 726 utilizes fragment format RAM 720 entries to assemble the revised egress data packet.

The entry identified by the fragment buffer identifier in fragment format RAM 720 contain three fields, including: (1) A valid bit to determine if that field needs to be processed; (2) The size of the data (in eight-byte increments) to send out; and (3) The location of the data to be sent out. The data to be sent out is located in the transmit FIFO 248 or the transmit work buffer 724. The assembler 730 will re-align the 64-bits of data according the packet offset field in the fragment CAM 722. If the fragment format RAM 720 field is valid, and the length is set to zero, this signifies that the remaining data will be taken from that source until the end of packet (EOP) is reached. The egress data packet is then sent to the second transmit parser 230 via data path 753. Control information associated with the egress data packet is sent to transmit parser 230 on data path 755. The fragment burst processor 726 works in tandem with the transmit burst processor 728 and sends packets out of the assembler 730 if the transmit burst processor 728 has enough data to run a data transfer.

J. Transmit Burst Processor 728

Transmit burst processor 728 is a block which sits in between the fragment processor 726 and the parser 230. It is designed to send out bursts of data nominally 64 bytes at a time. Transmit burst processor 728 makes sure there is at least one burst quanta of data available from fragment burst processor 726 and space available in the packet FIFOs downstream before it runs a cycle and sends out a burst of data. Transmit burst processor 728 also supplies the out of band control information for the packet bursts while assembler 730 supplies the data. After transmit burst processor 728 passes the entire egress data packet, the End of Packet (EOP) flag is sent to parser 230 signifying that it is done with the packet.

K. Transmit ACL 234

Transmit ACL 234 utilizes the internal transmit ACL CAM 234b to determine if the revised egress data packet should be counted and killed or sent to egress mirror FIFO 250. Transmit Access Control List (ACL) 234 includes transmit ACL processor 234a and transmit ACL CAM 234b. As revised egress data packet leave second transmit parser 230, the Ethertype/LLC/PPID is extracted and utilized by transmit ACL processor 234a to determine what type of ACL construct will be assembled for the modified egress data packet. Based on the ACL search type, a transmit ACL key is extracted from the revised egress data packet data fields and transmit ACL processor 234a searches transmit ACL CAM 234b to find a rule to make a transmit ACL decision.

A plurality, for example up to sixteen, of different entries are provided in a ACL search type table within transmit ACL processor 234a. The ACL search type table is accessed using the Ethertype/LLC/PPID field from page 0 of the second transmit parser 230 result. The ACL search type table also provides typing bits per entry to handle the different, for example three different, input filed types.

Generally, the format portion of the transmit ACL search table type can specify up to two search operations in the ACL CAM 234b. However, IP v6 and IPX searches are both doublewide operations due to the large key formats involved. Thus IP v6 and IPX searches span both available search slots and only one search of ACL CAM 234b may be possible in some embodiments.

The transmit modification index provides two fields to the transmit ACL processor 234a. The two fields are the direct index and the virtual port. When the virtual port field is zero, normal ACL key assembly is performed based on the predefined formats. When the virtual port field is not zero, the VLAN Id and virtual port fields are replaced with the transmit modification index supplied field. This allows the transmit modification index to directly dictate the virtual port field of a transmit ACL CAM 234b search.

When the direct index field is zero, normal searches of the ACL search type table are executed as stated above. When the direct index field in not zero, the ACL search type table is directly accessed at the direct index value. This allows the transmit modification index to directly dictate the type and format of the transmit ACL 234b search.

L. Packet Marker 232

Transmit marker 232 performs: (1) QoS bits modification, modifying for example QoS bits including, but not limited to: (a) VPRI (for VLAN data packet headers); (b) EXP (for MPLS data packet headers); (c) Traffic Class (for IPv6 data packet headers); and (d) IPToS (for IPv4 data packet headers); and (2) OSI layer L3/L4 checksum calculation and modification. The two functions may be fully programmable via egress mark commands (EMCs) in the transmit modification recipe. Packet addressor 112 provides programmable modification of multiple QoS fields, including those identified above, without delaying the throughput of data through packet addressor 112. Packet processor 112 also provides an egress marking system capable of modify the outer or inner set of headers in a Transparent LAN Service (TLS) data packet.

In one example, any of the VLAN VPRI, MPLS EXP, and IPv4/IPv6 ToS fields may be modified through this process utilizing VPRI, EXP, and IPToS tables in transmit state table RAMs 232c as appropriate. The egress mark control information may also be derived from one or more egress mark sets (a three-bit Egress Mark Select (EMS) and a three-bit Egress Mark Mask (EMM)) in the new AFH pre-pended to an ingress data packet and from one or more egress mark commands within a transmit modification recipe for the egress data packet.

Packet marker 232 includes packet marker processor 232a, transmit post processor RAM 232b, and transmit state table map RAMs 232c. State table map RAMs 232c may include VPRI, EXP and IPToS map RAMs. As packet addressor 112 processes an ingress data packet, a lookup in the CAM 204a and receive associated RAM 242a yields a pointer to a transmit modification recipe which may include one or more egress mark commands. On a CAM 240a search match, receive associated data RAM 242a may return a three-bit Egress Mark Mask (EMM) value and a three-bit Egress Mark Select (EMS) value. The pairing of the data is EMM/EMS with EMM occupying the higher order bits and EMS the lower order bits.

As packet addressor 112 processes an ingress data packet, egress mark sets may also originate from the VLAN State Table (VST) and Port State Table (PST) in state tables 304b.

Egress mark sets generated from state tables 304b may be subject to the same priority resolution as the CAM 240a generated results. Furthermore, if the EMM bits are all zeros, the corresponding EMS bits' values may be nullified (zeroed out) internally within receive components 112b, irrespective of their receive associated RAM 249a values.

EMM provides one mask bit for VPRI, EXP, and IPToS, allowing each of the three fields to be changed according to the mask bits. The order of the EMM bits is defined to be {IPTOS_EMM, EXP_EMM, VPRI_EMM}. The EMS value is utilized as an index into transmit state table map RAMs 232c for generating VPRI, EXP and/or IPToS values. A priority value may be assigned to the transmit state table map RAMs 232c search from the SCT RAM 306 entry for the search. An EMM/EMS result preferably has higher priority than a previous result to override the previous result.

Upon completion of receive processing, packet addressor 112 may pass the final egress mark set (or NULL) out on the internal network packet transfer device 204. The six bits are carried in the internal network packet transfer device 204 control bits. The six bits will follow the data packet as the data packet travels through the internal network 104. The six bits may then be present in the transmit control bits when the packet is presented to the transmission components 112b.

Distributor 106 may provide a three-bit queue number, referred to as QNUM, across the internal network packet transfer device 204 to the internal network transmit interface 212. When the egress data packet arrives at internal network transmit interface 212, the egress mark set and the QNUM field may be extracted from the internal network transmit interface 212 control and passed to transmit FIFO 248. First transmit parser 226 may then extract the VPRI bits from the outermost VLAN (closest to the MAC DA), the EXP bits from the outermost MPLS label, and the IPToS bits from the outermost IP header. The VPRI bits, EXP bits, and IPToS bits, may be referred to respectively as a first VPRI field, a first EXP field, and a first IPToS field. First transmit parser 226 also may extract the original TCP/UDP checksum and calculate the partial checksum.

The first VPRI field, first EXP field, and first IPToS field and the partial checksum is also be passed to transmit modification processor 718. Transmit modification processor 718 writes the egress mark set, QNUM, first VPRI field, first EXP field, and first IPToS field to transmit post processor RAM 232b.

The egress mark command may have two forms: (1) Transmit modifier VPRI-EXP egress mark commands (TXM VPRI EMC); and (2) Transmit modifier IPToS egress mark commands (TXM IPTOS EMC). The two forms of egress mark commands both have 34 bits, the first five of which are transmit modifier commands. A transmit modifier commands of zero indicates no packet marker processor 232a action. Other transmit modifier commands may indicate packet marker processor 232a should replace VPRI, EXP, and/or IPToS values with new values derived from transmit state table map RAMS 232c and/or modification RAM 246a. Egress mark set and QNUM values may be used as indices to transmit state table map RAMS 232c.

A plurality, for example four, egress mark commands may be present in a transmit modification recipe. Multiple labels may be changed. When multiple egress mark commands are present, there is an order of precedence. For example, EMC3 may have the highest priority, and EMC0 the lowest priority. If there is ever a conflict between EMCs, the order of precedence determines which egress mark command has the highest priority. The TXMI RAM arbiter 708 puts the first EMC command in the transmit modification recipe in EMC0 slot. Subsequent EMC commands in the transmit modification recipe are placed in subsequent EMC slots, for example, EMC1, EMC2, and EMC3. Therefore, the last EMC in the transmit modification recipe has the highest priority. An EMC whose code value is 0 (no packet marker 232 and egress ACL 234 action) has the lowest priority regardless of its placement within the transmit modification recipe.

For some egress mark command values, all VPRI, EXP, and IPToS fields may be changed. If no egress mark command is present in the transmit modification recipe, the packet marker processor 232a may leave the VPRI, EXP or IPToS fields unmodified.

For VPRI and EXP fields, packet marker processor 232a may use either egress mark select or QNUM bits depending upon the egress mark command code field value or the sub-channel to index into a transmit state table map RAMs 232c. Transmit state table map RAMs 232c returns a three-bit value to be used in the modification operation.

IX. An Embodiment of Functions Associated with Transmit Components

Figure 8:
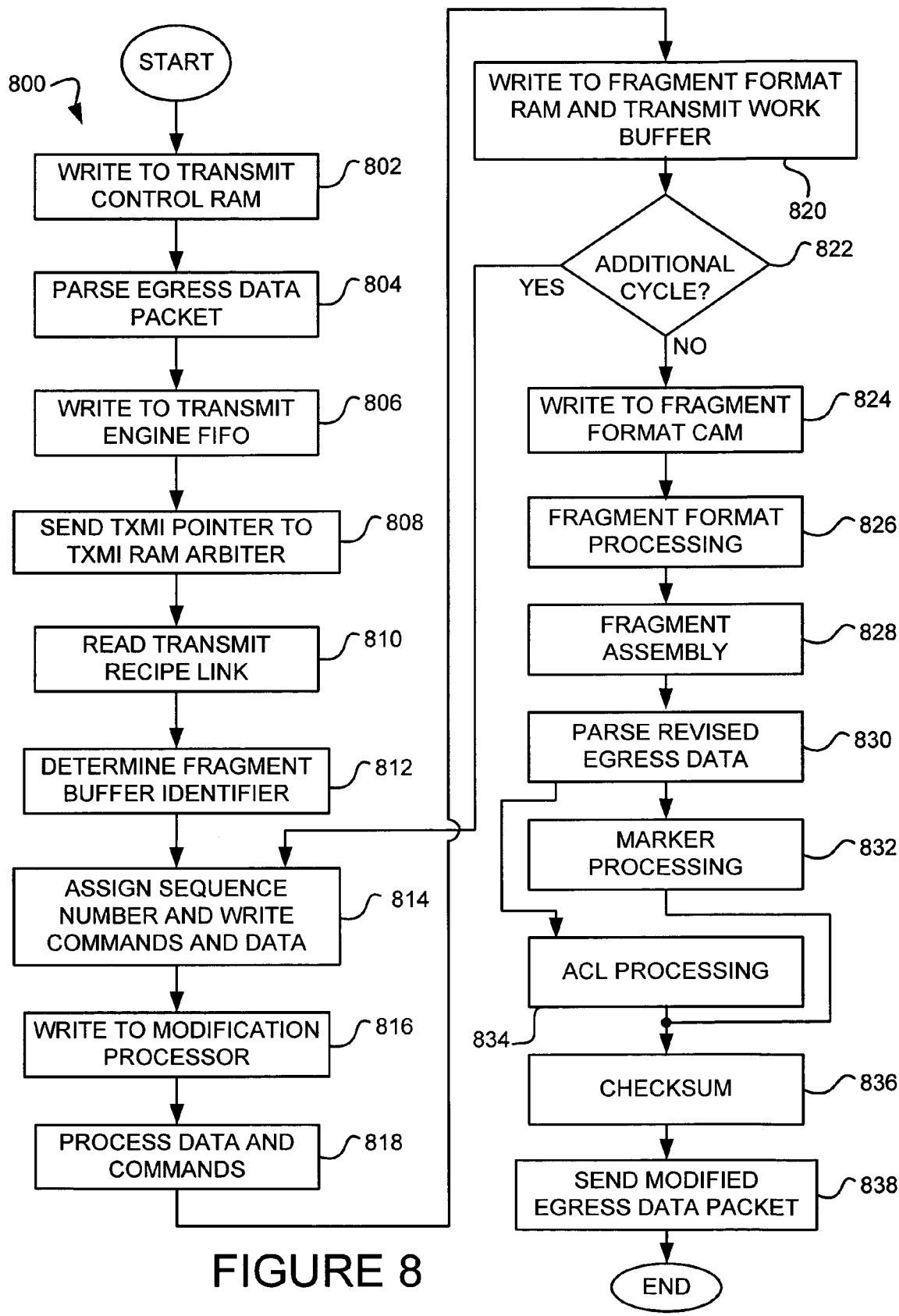
FIG. 8 shows a flowchart of an embodiment of the functions associated with the transmit components of the packet addressor of FIG. 1.

FIG. 8 shows a flowchart 800 of an embodiment of the functions associated with the transmit path components 112b of packet addresser 112 of FIG. 1. Internal network transmit interface 212 provides egress data packets or egress datagrams to ingress module 224 from the internal network 106. The egress data packets may arrive at ingress module 224 in two bursts of up to sixty-four bytes in each burst. The bursts are written into the transmit FIFO 248. A checksum may also be verified at interface 212. Egress data packets with a bad checksum may be marked with an error bit at the internal network transmit interface 212 so the MAC sublayer 102c can drop and count the egress data packets.

In block 802, as bursts arrive over a sub-channel, the ingress module writes to transmit in control RAM 704: (1) the burst length over the sub-channel; (2) an End-of-Packet (EOP) for the egress data packet; and (3) the transmit modification index (TXMI) pointer. The TXMI pointer is a field inside the new AFH created by receive components 112a. The new AFH occupies the first eight bytes of the egress data packet.

In block 804, the egress data packet is also sent through first transmit parser 226. Parser 226 identifies contexts representing OSI boundaries within the egress data packet. The OSI boundaries may be referred to as "contexts." The results of first transmit parser 226 are written into first transmit parser RAM 702. The results include contexts and status bits. First transmit parser RAM 702 makes the results of first transmit parser 226 available to transmit modification processor 718.

In block 806, when the first two bursts of the egress data packet arrive, or the end of packet (EOP) flag if less than 128 bytes, the ingress module 224 posts to the transmit engine FIFO 706: (1) the transmit FIFO 248 pointer to the egress data packet Start-of-Packet (SOP); and (2) a sub-channel identifier for the sub-channel the egress data packet arrived on. Data is written to the transmit engine FIFO 706 using a round-robin scheme over the sub-channel. If transmit engine FIFO 706 is full, ingress module 224 will wait before posting data from the egress data packet.

In block 808, the transmit command sequencer 712 reads the egress data packet SOP pointer and sub-channel identifier from transmit engine FIFO 706 and then reads from transmit control RAM 704 at the address specified by the egress data packet SOP pointer and sub-channel identifier. The transmit command sequencer 712 read of the transmit control RAM 704 returns: the TXMI pointer; (2) packet header length (HLEN); and (3) the EOP flag. The HLEN is the number of bytes valid in the first two bursts from the internal network transmit interface 212. If the egress data packet is greater than 128 bytes, the HLEN is 128. Internally, an egress data packet has eight bytes of AFH and two bytes of interface 212 checksum added, so the internal egress data packet length has ten bytes greater than the external egress data packet length. The transmit modification index pointer is passed to the TXMI RAM arbiter 708. The TXMI pointer points to an entry in the modification RAM 246a that contains either an internal transmit link or an external transmit link.

In block 810, TXMI RAM arbiter 708 posts a request and reads the transmit recipe link from transmit modification RAM 246a. The transmit recipe link identifies external command sets and internal command and associated data and masks. The associated data and masks are in transmit modification RAM 246a.

In block 812, the modification processor 718 allocates a fragment buffer within fragment format RAM 720. Fragment format RAM 720 may have sixty-four fragment buffers, which are shared by the six pipelines of transmit modification processor 718. A fragment buffer identifier is used as a handle to track outputs from the modification processor 718. The fragment buffer identifier may also include an address for internal working data storage for the pipelines of the modification engine 708. This fragment buffer is used until the transmit burst processor 728 has completely processed the egress packet and sent it to the second transmit parser 230. At which time this fragment buffer will be freed so that it can used by another packet.

In block 814, TXMI RAM arbiter 708: (1) assigns a sequence number to the egress data packet header; and (2) performs burst reads of command sets, whether internal and/or external, and data from external modification RAM 246a. The sequence number to the egress data packet header follows the egress data packet header through the modification engine 228. The sequence number is used to prevent re-ordering of egress data packets. As the burst read occurs, commands are written into internal command RAM 714. Command RAM 714 stores the internal and external command sets originating in internal recipe RAM 710 and external transmit modification RAM 246a respectively. Internal command RAM 714 holds up to 32 commands and 32 data entries per transmission modification recipe. Preferably, transmission modification recipes may be limited to 32 entries for commands and 32 entries for data. As the burst read occurs, data and masks associated with the commands are written to data RAM 716.

Transmit command sequencer 712 waits for an available slot in a transmit modification processor 718 pipeline. There are six stages to the transmit modification processor 718 pipelines. In block 816, when a slot is available, transmit command sequencer 712 passes to the modification processor 718: (1) the address of the command RAM 14 where the current transmit modification processor command is located; (2) the address of the data RAM 716 of where the data associated to the command is located; (3) packet channel and sub-channel information; (4) EOP and SOP flags; (5) egress packet buffer ID; (6) egress packet length; (7) egress packet sequence number; (8) last transmit modification processor command flag; (9) debug flags; (10) modification RAM 246a parity error flag; and (11) internal recipe RAM 710 parity error flag In block 818, modification processor 718 processes transmit modification commands. The modification processor 718 may be understood as a six-stage modification processor that utilizes a 128-bit data path. The six stages are: (1) Recipe command pre-fetch; (2) Command fetch; (3) Command decode; (4) Data fetch; (5) Barrel shift and sum; and (6) ALU. In block 818, the six stages are completed. In the recipe command pre-fetch stage, the modification processor 718 pre-fetches recipe commands from command RAM 714.

In the command fetch stage, the modification processor 718 fetches: (1) Recipe commands from command RAM 714; (2) Data and masks associated with the recipe commands from data RAM 716. In the command decode stage, modification processor 718 calculates transmit FIFO 248 addresses and decodes recipe commands. In the data fetch stage, the modification processor 718 reads egress data packet data from transmit FIFO 248, data RAM 716, and any required data from previous stages. In the barrel shift and sum stage, the modification processor 718 operates barrel shifters to realign data to arbitrary byte boundaries and masks and 'ORs' the data components. In the ALU stage, the modification processor 718 performs arithmetic operations such as, but not limited to, add, subtract, OR, and XOR on egress data packets. All modification data, even non-ALU operations, passes through the ALU stage with an equivalent NOP command.

Revised data emerging from the ALU stage may be written into transmit work buffer RAM 724 as aggress packet data fragments. Transmit work buffer RAM 724 has space for up to 256 bytes of data per buffer. The address of the buffers of the transmit work buffer RAM 724, are included in the fragment buffer for the current egress data packet.

In block 820, modification processor 718 writes to fragment format RAM 720 and transmit work buffer 724. A fragment is a 64-bit block of data. Fragment format entries in fragment format RAM 720 include: (1) The starting address of revised packet fragment in transmit work buffer 724; or unrevised packet fragment from transmit FIFO 248; (2) The number of 64-bit-words of revised data in the transmit work buffer 724 or unrevised packet data from transmit FIFO 248; and (3) identification of the source of the fragment data. The source referred to by the entries in the fragment format RAM 720 may be transmit FIFO 248 or transmit work buffer 724. In one embodiment, the fragment format RAM 720 must be written in ascending byte order. If not written in ascending byte order, fragment format RAM 720 cannot back up. If written in ascending byte order, once a byte within a fragment has been created, it cannot be modified. Therefore, the transmit modification recipe is preferably written in ascending, packet output format, order.

In block 822, packet engine 220 determines whether blocks 814 through block 820 must be repeated to complete the transmit modification recipe. Blocks 814 through block 820 may be repeated until modification processor 718 has processed all commands in the transmit modification recipe. Transmit modification recipes generally require more than one pass through the modification processor 718 pipeline. However, block copies, block inserts and block replaces may require one pass through the modification processor 718 per 32 bits of data.

In block 824, when the processing of the transmit modification recipe is complete, the modification processor 718 writes to fragment CAM 722: (1) The sub-channel identifier from block 808; (2) The egress data packet sequence number determined in block 814 by the TXMI RAM arbiter 708; (3) the egress data packet SOP pointer from block 808 (pointing into transmit FIFO 248); and (4) The total count of the fragment buffers created in fragment format ram 720.

Transmit modification processor 718 is then finished with the revised egress data packet and modification processor 718 becomes available for processing another egress data packet header.

In block 826, fragment processor 726 processes entries in fragment CAM 722 based upon sequence number order to prevent packets from being reordered. TXMI RAM arbiter 708 assigns the block 814 sequence numbers in an incrementing fashion. Sub-channels have their own sequence number set. Fragment processor 726 generally processes packets in the order in which they were received by the transmit components 112b. Fragment processor 726 searches fragment CAM 722 for a packet with the next expected sequence number from a sub-channel. If one packet gets ahead of another in the transmit modification processor 718 pipelines, fragment CAM 722 will have a packet with sequence number n+1 but no packet with sequence number n. Fragment processor 726 may wait until the sequence number n packet is written to the fragment CAM 722 before proceeding. If the next expected sequence number is not found, the fragment processor 726 takes no action with respect to the sub-channel at that time, and may proceed to process the next sub-channel. This is generally done independently for each sub-channel. Thus, head of line blocking may be avoided.

In block 828, when a packet with the next expected sequence number appears in fragment CAM 722, the transmit burst processor 728 reads: (1) The sub-channel identifier; (2) The egress data packet SOP pointer; and (3) The total length of the fragment buffer created in fragment format ram 720. Transmit burst processor 728 provides transmit bursts in conjunction with fragment processor 726. Transmit burst processor 728 may require that at least 64 bytes of data are present for a sub-channel before a burst can be run. If more than one sub-channel is ready, a round-robin arbiter may be used to determine the next burst. As long as there is data left associated with the fragment buffer in fragment format RAM 720, fragment processor 726 will supply the data for the transmit bursts associated with the fragment buffer. Fragment format RAM 720 is processed in linear order and the revised egress data packet is generated on the fly by reading packet fragments from transmit FIFO 248 and the transmit work buffer 724 and assembling revised egress data packets in assembler 730.

In one embodiment, assembler 730 is a multiplexor that is directed to responsive to the fragment buffer entry multiplex between outputting on data path 753, the revised packet fragments as stored in the transmit work buffer 724 and the unrevised packet fragments as stored in transmit FIFO 248. The unrevised packet fragments are provided to assembler 730 from the aligner 734 over data path 752. Through this process, the revised egress data packet is assembled in ascending order on data path 753. In one embodiment, data path 753 has a width less than the width of data path 751. In one implementation, fragment processor 726 and transmit burst processor 728 output revised egress data packet in the form of bursts.

Unrevised packet fragments coming from transmit FIFO 248 are configured as 64-bit words un-aligned. In the case of 64-bit word un-aligned data arriving from transmit FIFO 248, fragment processor 726 or transmit burst processor 728 are read from transmit FIFO 248 at address n and n+1 to fetch 128 bits of data. Fragment processor 726 and/or transmit burst processor 728 utilizes a data aligner to create the 64 bits of data for the transmit bursts. When the packet fragment is completed, control is passed to the transmit burst processor 728 and the transmit burst processor 728 notifies the modification processor 718 that the fragment buffer of fragment format RAM 720 associated with the fragment buffer identifier is available. Transmit burst processor 728 is then responsible for transmitting the remainder of the revised egress data packet to parser 230.

In block 830, the revised egress data packet is sent through second transmit parser 230. Parser 230 identifies contexts representing OSI boundaries within the revised egress data packet. The OSI boundaries may be referred to as "contexts." In one embodiment, the results of second transmit parser 230 are written into second transmit parser RAM 732. In another embodiment, the results may be passed through a pipeline to packet marker 232 and transmit ACL 234. The results include contexts and status bits for the revised egress data packet. Parser 230 or parser RAM 702 makes the results of second transmit parser 230 available to packet marker 232 and transmit ACL 234.

Revised egress data packets enter packet marker 232 and transmit ACL 234. Revised egress data packets enter packet marker 232 and transmit ACL 234 in parallel. In block 832, transmit marker 232 performs: (1) QoS bits modification, modifying for example QoS bits including, but not limited to, VLAN VPRI, MPLS EXP, and IPv4/IPv6 ToS; and (2) OSI layer L3/L4 checksum calculation and modification.

In block 834, transmit ACL 234 may utilize internal transmit ACL CAM 234b to determine if the revised egress data packet should be counted and killed, sent to host processor 206a, and/or sent to egress mirror FIFO 250. In one embodiment, the entries in transmit ACL CAM 234b have been made by the modification engine 228 responsive to the bits of the new AFH, illustrated in FIG. 5, pre-pended to the ingress data packet. In another embodiment, entries in transmit ACL CAM 234b may have been made to host processor 206a.

In block 836, from transmit ACL 234 and packet marker 232 the revised egress data packet is passed to a checksum generator in transmit egress module 236 or external network transmit interface 214. The checksum is calculated and written into the revised egress data packet unless the revised egress data packet came into the packet addressor 112 with a bad checksum. If the revised egress data packet came into the packet addressor 112 with a bad checksum, an inverted version of the checksum will be written into the revised egress data packet.

In block 838, the modified egress data packet or modified egress datagram exits the packet addressor 112 through external network transmit conduit 214. From external network transmit conduit 214, the modified egress data packet goes to the MAC for transmission in external network 102.

X. Additional Embodiments

Figure 9:
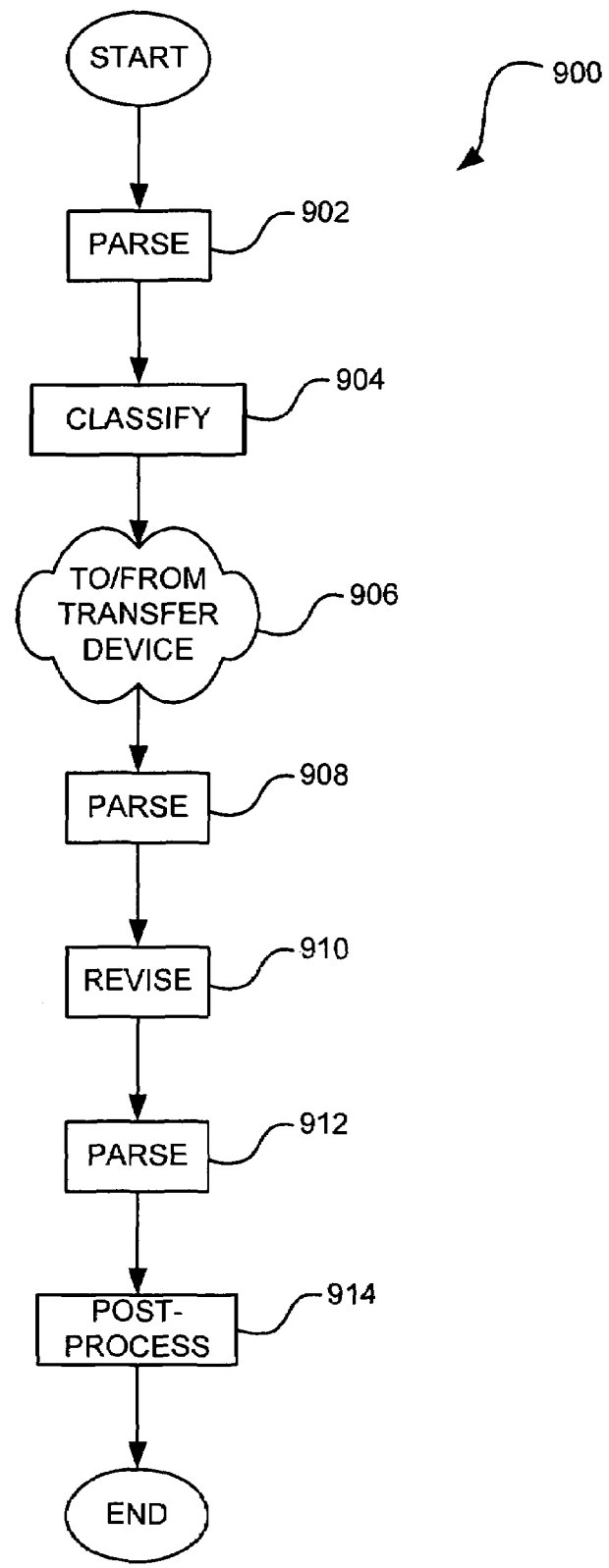
FIG. 9 is a flowchart of an embodiment of method of processing a packet that comprises multiple parsing steps.

FIG. 9 is a flowchart of one embodiment 900 of a method of processing a packet. In this embodiment, the method comprises step 902, parsing a packet and providing first data representative thereof, and step 904, classifying the packet responsive to the first data.

In step 906, the packet is forwarded to and received from a transfer device, such as transfer device 204 and interfaces with transfer device 204, which may perform additional processing of the packet. Step 908 comprises parsing the packet received from the switching transfer device (which may be the packet forwarded to the transfer device, or a packet derived there-from), and providing second data representative thereof.

Step 910 comprises revising the packet responsive to the second data, and step 912 comprises parsing the revised packet and providing third data representative thereof. Step 914 comprises post-processing the revised packet responsive to the third data.

In one embodiment, the packet undergoing processing has a plurality of encapsulation layers, and each of the first, second and third parsing steps 902, 908, 912 comprising providing context pointers pointing to the start of one or more of the encapsulated layers of the packet.

In a second embodiment, the packet undergoing processing comprises a first packet forming the payload portion of a second packet, each of the first and second packets having a plurality of encapsulation layers, and each of the first, second and third parsing steps 902, 908, 912 comprises providing context pointers pointing to the start of one or more of the encapsulated layers of the first packet and one or more of the encapsulated layers of the second packet.

In one implementation, the post-processing step comprises computing a checksum for the revised packet. In a second implementation, the post-processing step comprises egress marking of the packet. In a third implementation, the post-processing step comprises the combination of the foregoing two implementations.

Figure 10:
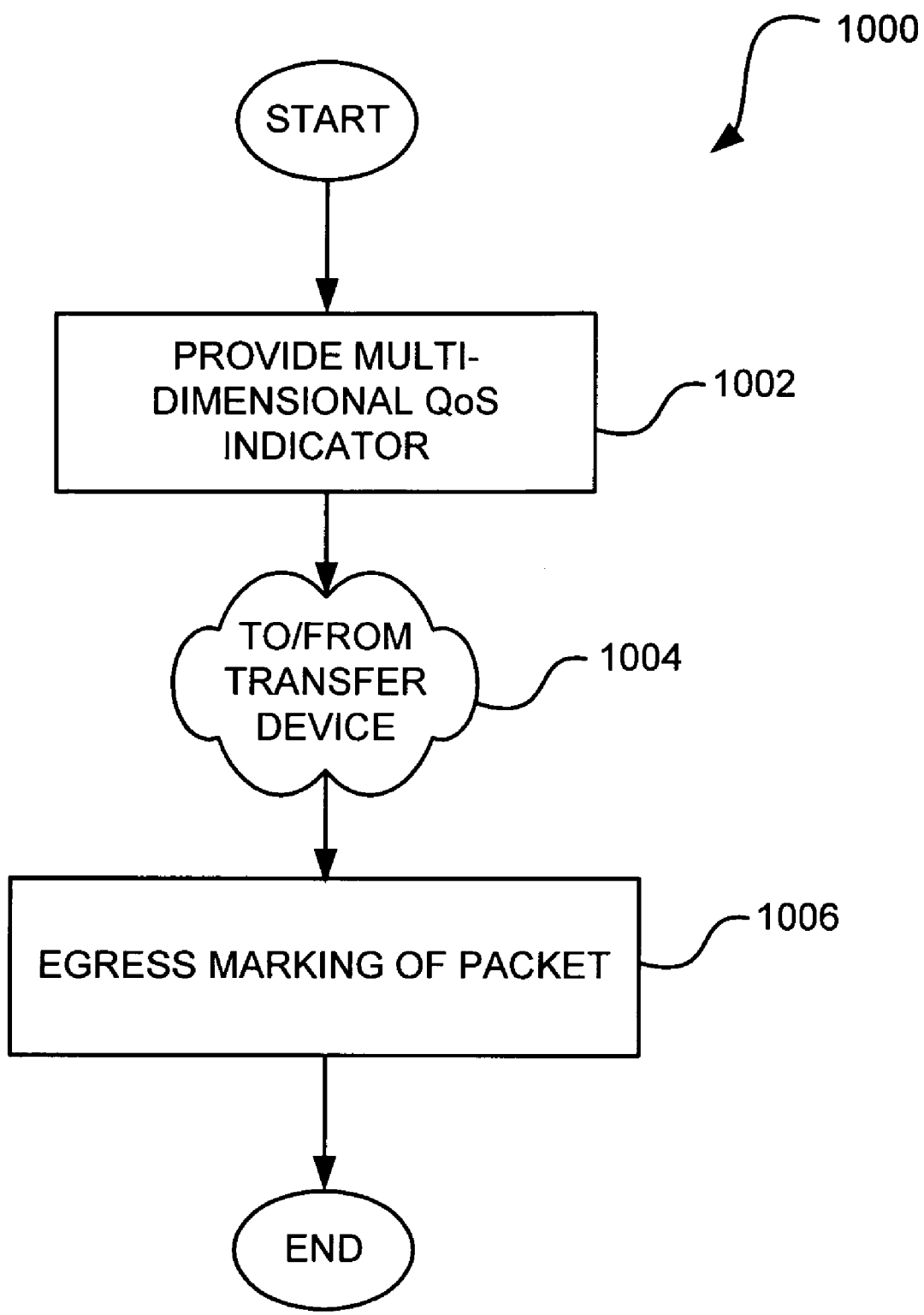
FIG. 10 is a flowchart of an embodiment of a method of performing egress marking of a packet.

FIG. 10 is a flowchart of a third embodiment 800 of a method of processing a packet. Step 1002 comprises providing a multi-dimensional QoS indicator for a packet. Step 1004 comprises forwarding the packet to and from a transfer device. Step 1006 comprises egress marking of the packet received from the transfer device (either the packet forwarded to the transfer device, or a packet derived therefrom), responsive to at least a portion of the multi-dimensional QoS indicator.

In one implementation, step 1006 comprises selectively modifying one or more quality of service fields within the packet received from the transfer device responsive to at least a portion of the multi-dimensional quality of service indicator.

In one configuration, the multi-dimensional quality of service indicator comprises an ingress quality of service indicator, an egress quality of service indicator, and packet marking control information, and step 1006 comprises selectively modifying one or more quality of service fields within the packet received from the transfer device responsive to the packet marking control information. In one example, the multi-dimensional quality of service indicator further comprises a host quality of service indicator.

In one embodiment, the method further comprises utilizing the ingress quality of service indicator as an ingress queue select. In a second embodiment, the method further comprises utilizing the egress quality of service indicator as an egress queue select. In a third embodiment, the method further comprises utilizing the host to select the quality of service indicator as an ingress queue select.

Figure 11:
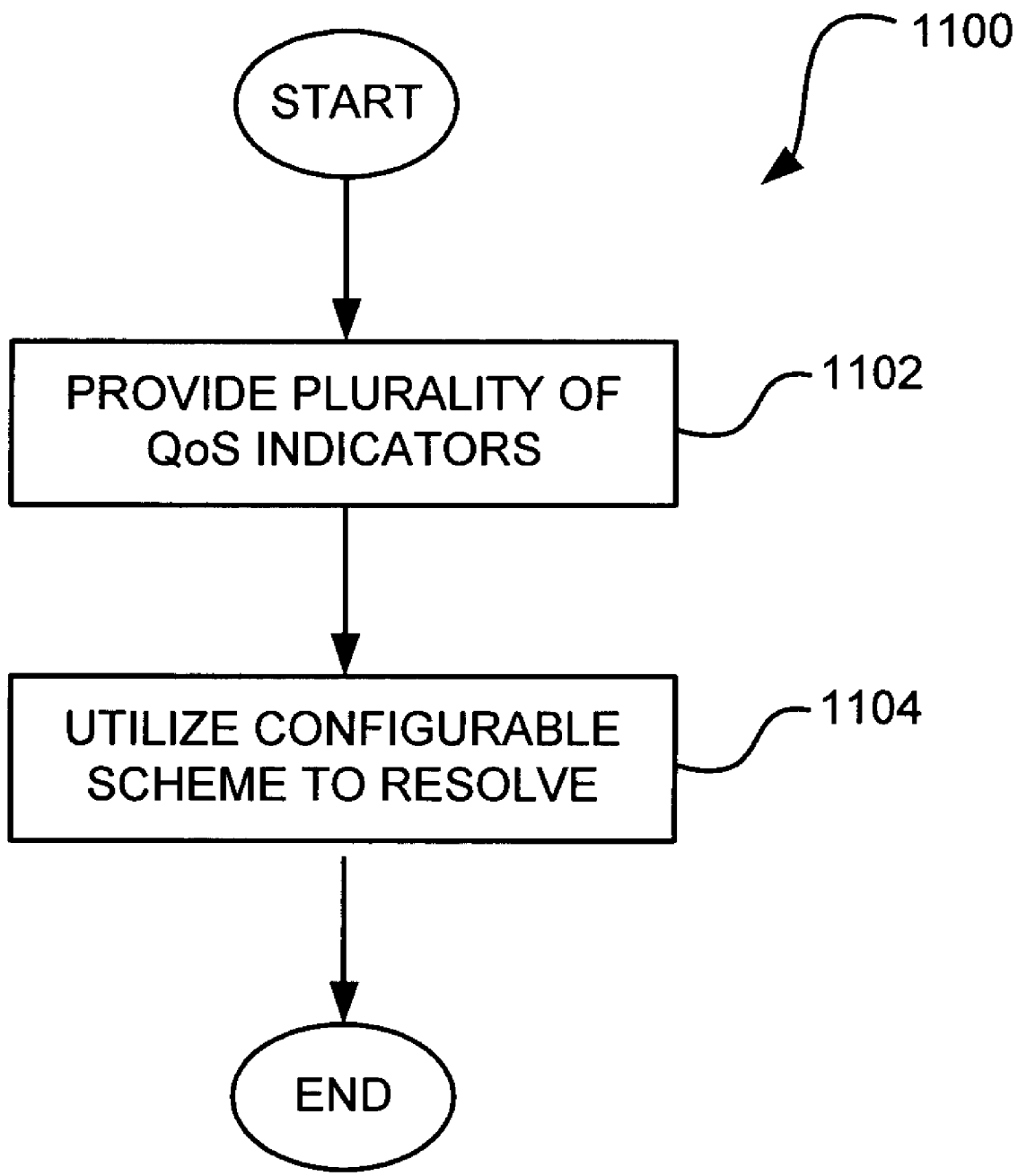
FIG. 11 is a flowchart of an embodiment of a method of resolving a plurality of quality of service (QoS) indicators for a packet utilizing a configurable priority resolution scheme.

FIG. 11 is a flowchart of an embodiment 1100 of assigning a quality of service indicator to a packet. In this embodiment, step 1102 comprises providing a plurality of quality of service indicators for a packet, each with an assigned priority, and step 1104 comprises utilizing a configurable priority resolution scheme to select one of the plurality of quality of service indicators for assigning to the packet.

In one implementation, step 1102 comprises mapping one or more fields of the packet into a quality of service indicator for the packet and an associated priority. In a second implementation, step 1102 comprises performing a search to obtain a quality of service indicator for the packet and an associated priority. A third implementation comprises a combination of the foregoing two implementations.

Figure 12:
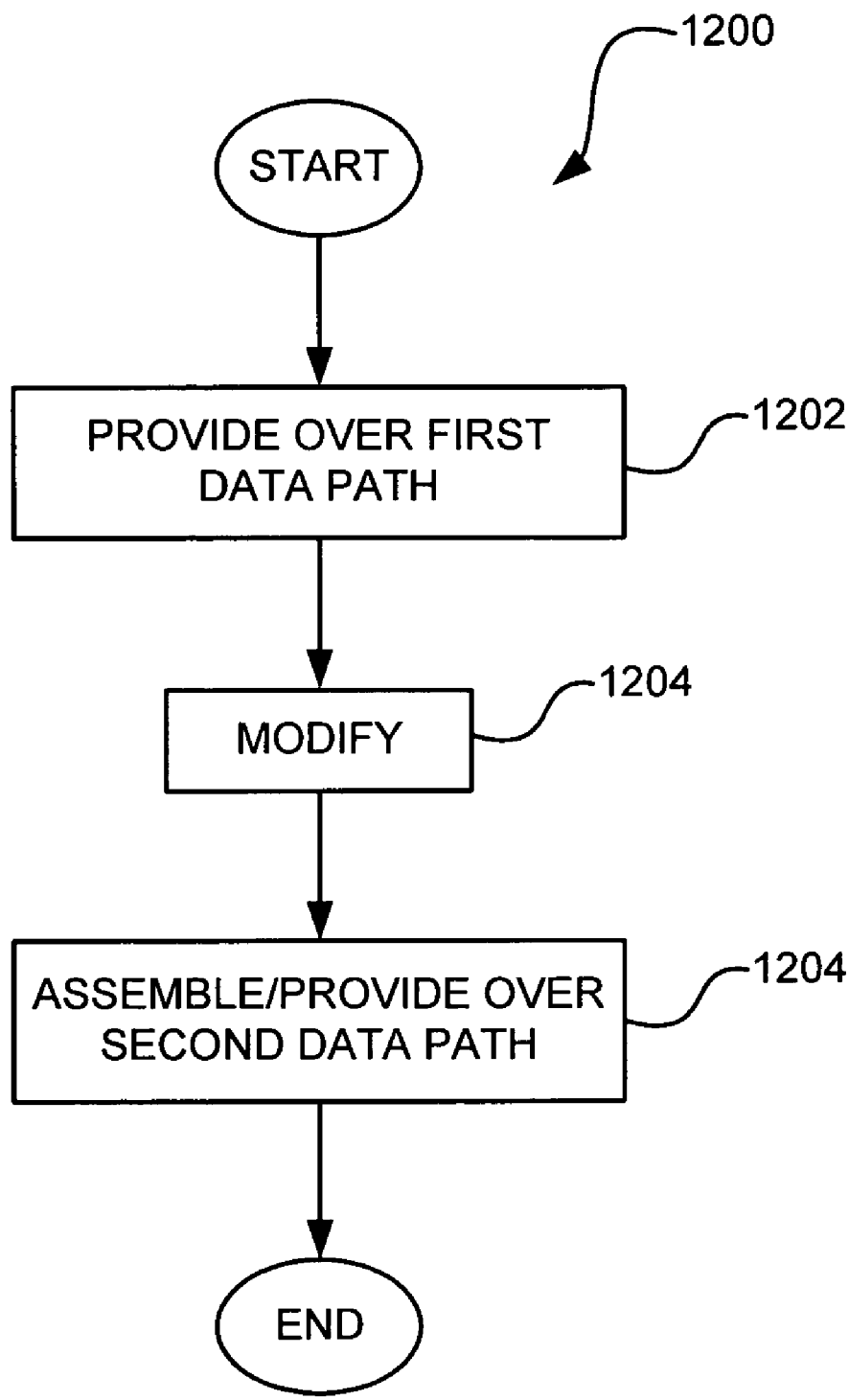
FIG. 12 is a flowchart of an embodiment of a method of modifying a packet in which sliced packet data is provided to a packet modification engine over a wide data path.

FIG. 12 is a flowchart of an embodiment 1200 of a method of revising a packet. Step 1202 comprises providing some or all of a packet as packet portions and providing the portions in parallel over a first data path having a first width to a modification processor. Step 1204 comprises modifying, in the modification processor, one or more of the packet portions. Step 1206 comprises assembling a packet from the one or more modified and one or more unmodified packet portions, and providing the assembled packet over a second data path having a second width less than the first width.

Figure 13:
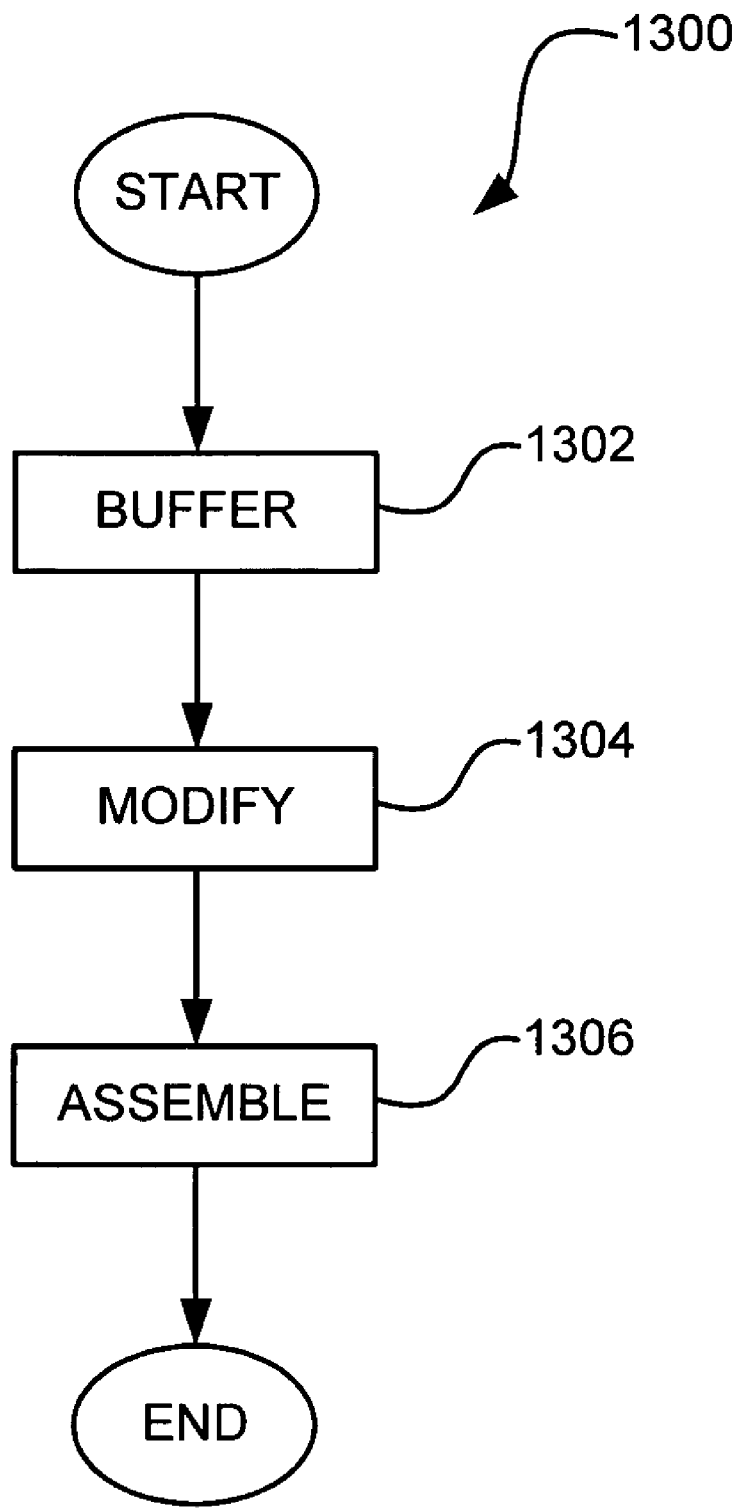
FIG. 13 is a flowchart of an embodiment of a method of modifying a packet which involves buffering the packet in a buffer upon or after ingress thereof, and assembling a packet on an egress data path from one or more revised packet fragments, and one or more unmodified packet fragments as retrieved directly from the buffer.

FIG. 13 illustrates an embodiment 1300 of a method of modifying a packet. Step 1302 comprises buffering the packet in a buffer upon ingress thereof. Step 1304 comprises modifying one or more portions of the packet. Step 1306 comprises assembling the one or more modified portions of the packet with one or more unmodified portions of the packet as retrieved directly from the buffer to form an assembled packet on an egress data path.

In one implementation, the method comprises providing a list indicating which portions of the assembled packet are to comprise modified portions of an ingress packet, and which portions are to comprise unmodified portions of the ingress packet, and step 1306 comprises assembling the assembled packet responsive to the list.

Figure 14:
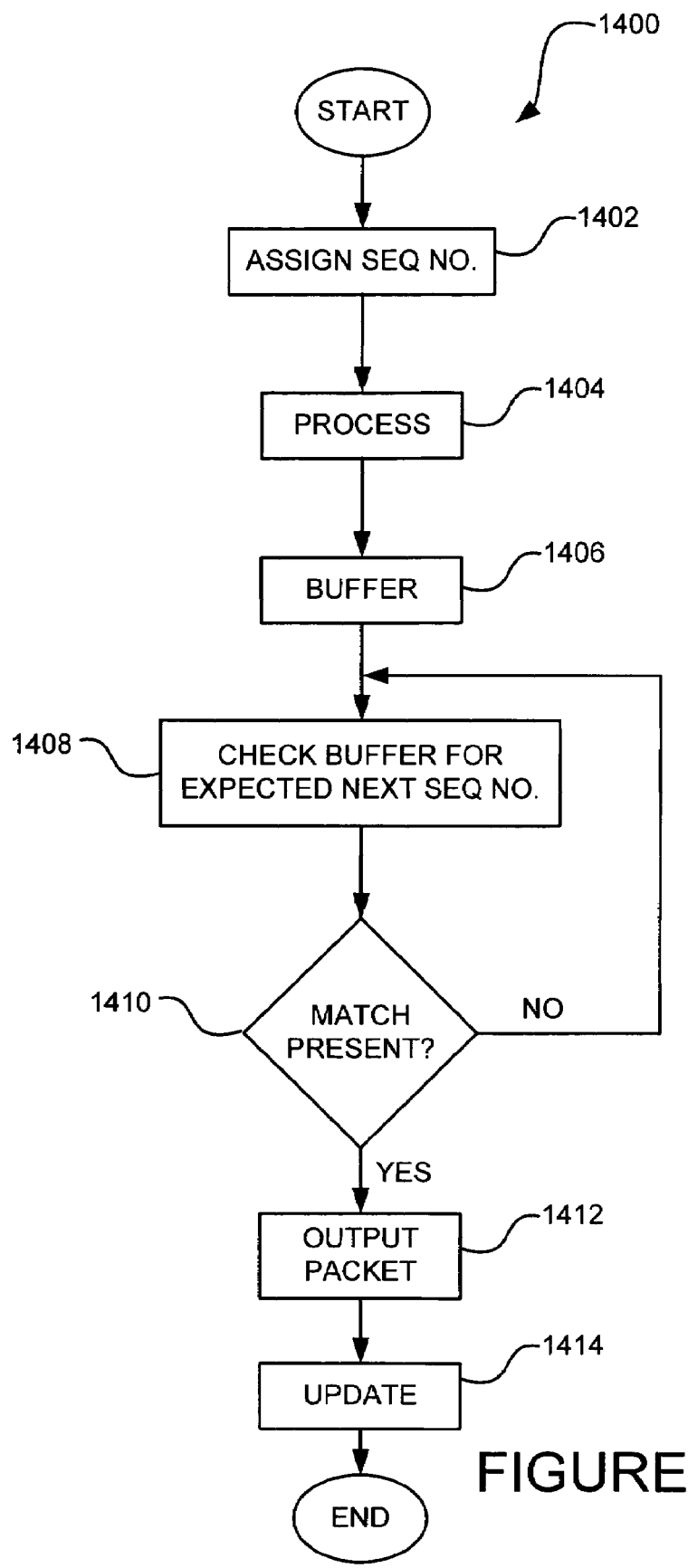
FIG. 14 is a flowchart of an embodiment of a method of preventing re-ordering of packets in a packet processing system.

FIG. 14 illustrates an embodiment 1400 of a method of preventing re-ordering of packets in a packet processing system. Step 1402 comprises assigning a sequence number to a packet upon or after ingress thereof to the system. Step 1404 comprises processing the packet. Step 1406 comprises storing data representative of the packet in a buffer. Step 1408 comprises checking the buffer for an entry matching an expected next sequence number. Inquiry step 1410 comprises determining if a match is present. If so, steps 1412 and 1414 are performed. Step 1412 comprises outputting the corresponding packet, and step 1414 comprises updating the expected next sequence number to reflect the outputting of the packet. If not, the method loops back to step 1408, thus deferring outputting a packet if a match is not present.

In one implementation, steps 1408-1414 comprise maintaining an expected next sequence number for each of a plurality of output channels, checking the buffer for a match for each of the channels, outputting the corresponding packet on a channel if a match for that channel is present and updating the expected next sequence number for that channel, and deferring outputting a packet on a channel if a match for that channel is not present.

Figure 15:
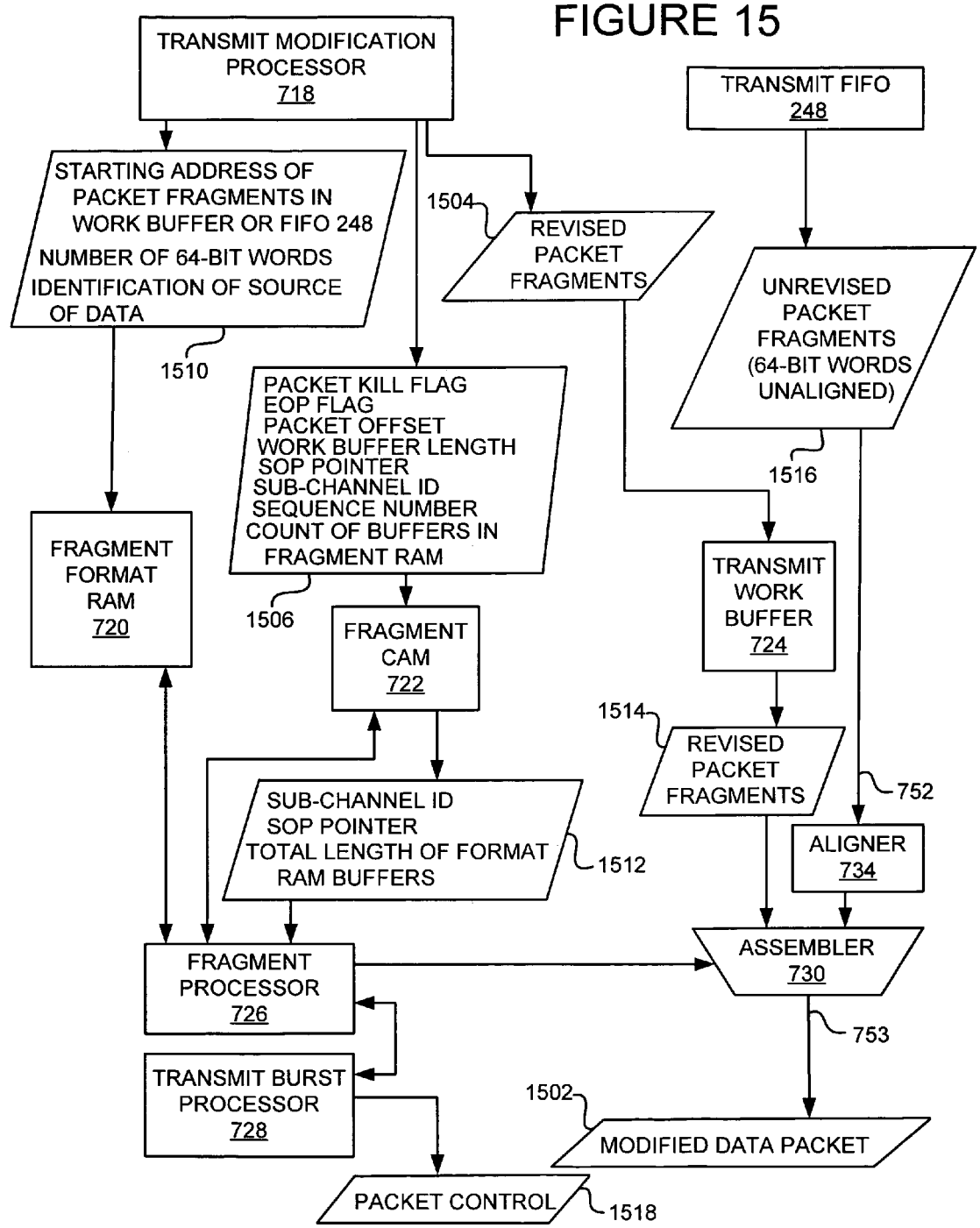
FIG. 15 is a data flow diagram of an embodiment of a system and method for assembling a data packet.

FIG. 15 shows a data flow diagram of an embodiment of a system and method for assembling a data packet. FIG. 15 shows some of the components of FIGS. 7A and 7B and some data flows between those components. FIG. 15 shows transmit FIFO 248, transmit modification processor 718, fragment format RAM 720, fragment CAM 722, transmit work buffer 724, fragment processor 726, transmit burst processor 728, and assembler 730.

Transmit FIFO 248 stores an egress data packet or a datagram. The egress data packets may arrive at ingress module 224 in bursts of nominally sixty-four bytes of data per burst. The bursts are written into the transmit FIFO 248. Each egress data packet is assigned a packet buffer or SOP pointer in FIFO 248. A packet buffer ID is used as a handle to track outputs from transmit FIFO 248 through the modification processor 718, through the fragment processor 726, through transmit burst processor 728, and out to second transmit parser 230. The packet buffer ID is used to derive the addresses for fragment format ram 720, fragment CAM 722, and transmit work buffer 724. The packet buffer ID and the buffer holding the egress data packet or a datagram will generally be freed only after the modified egress data packet 1502 or modified egress datagram has left packet addressor 112. After the modified egress data packet 1502 or modified egress datagram has left packet addressor 112 the packet buffer ID can be used by another packet.

After the egress data packets arrive into transmit FIFO 248, they are passed to the transmit modification processor 718 which then executes the transmission modification recipe. The modification recipe consists of up to 32 commands. The result of each command executed in the transmit modification processor 718 is revised packet fragment data 1504 and fragment control data 1510. The revised packet fragment data 1504 is either one or two 64-bit revised data fragments 1504. The revised packet fragment data 1504 is written into transmit work buffer RAM 724. The addresses of the transmit work buffer RAM 724 buffers are based upon the packet buffer ID. The addresses of the transmit work buffer RAM 724 buffers are included in the fragment control data 1510.

Fragment format RAM 720 buffer includes a list of fragment control words, which determine how the final egress data packet will be assembled. The fragment control date 1510 in fragment format RAM 720 includes: (1) a valid bit to determine if that field needs to be processed; (2) identification of the source of the fragment data, either the transmit work buffer 724 or the transmit FIFO 248; (3) the starting address of the revised packet fragment in transmit work buffer 724, or unrevised packet fragment from transmit FIFO 248; (4) the number of consecutive 64-bit words of data to process. If the fragment format RAM 720 field is valid, and the length is set to zero, this signifies that the remaining data will be taken from that source until the end of packet (EOP) flag is reached. In one embodiment, fragment format RAM 720 must be written in ascending byte order. If not written in ascending byte order, fragment format RAM 720 cannot back up. If written in ascending byte order, once a byte within a fragment has been created, it cannot be modified. Therefore, the transmit modification recipe is preferably written in ascending, packet output format, order.

Transmit modification processor 718 can process up to six different egress data packets concurrently until the recipe command set has been exhausted and then it passes the control of the egress packet buffer to the fragment processor 726 by writing a 32-bit entry to the fragment CAM 722. When a packet with the next expected sequence number appears in fragment CAM 722, transmit burst processor 728 reads an entry 1512 from fragment format CAM 722 that includes: (1) the egress data packet sequence number (2) The sub-channel identifier; (3) the egress data packet SOP pointer (pointing into transmit FIFO 248), (4) the EOP flag (5) The total count of the fragment buffers created in fragment format ram 720 (6) packet offset for the aligner; and (7) packet kill flag. Fragment processor 726 block searches fragment CAM 722 for the next sequence number per sub-channel to process, which prevents packet re-ordering, and sends out that packet through assembler 730. Fragment processor 726 utilizes all of fragment format RAM 720 entries to assemble the modified egress data packet 1502. Fragment processor 726 processes entries in fragment CAM 722 based upon sequence number order to prevent packets from being reordered per sub-channel.

Transmit burst processor 728 works in conjunction with the fragment processor 726 and FIFO buffer availability downstream. As long as there is data left associated with the fragment buffer in fragment format RAM 720 and space available downstream for the packet bursts, fragment processor 726 will supply the data for the transmit bursts associated with the fragment buffer. Transmit burst processor 728 may require that at least 64 bytes of data are present for a sub-channel before a burst can be run. Fragment format RAM 720 is processed in linear order and the revised egress data packet is generated on the fly by reading packet fragments from transmit FIFO 248 and the transmit work buffer 724 and assembling revised egress data packets in assembler 730.

In one embodiment, assembler 730 is a multiplexor that is directed to be responsive to the fragment buffer entry in fragment format RAM 720 and multiplex between outputting on data path 753, the revised packet fragments 1514 as stored in the transmit work buffer 724 and the unrevised packet fragments 1516 as stored in transmit FIFO 248 in the form of modified data packet 1502. The unrevised packet fragments 1516 are provided to assembler 730 by the aligner 734 from data path 752. Through this process, the modified egress data packet is assembled in ascending order on data path 753.

Unrevised packet fragments 1516 coming from transmit FIFO 248 are configured as 64-bit words un-aligned. In the case of 64-bit word un-aligned data arriving from transmit FIFO 248, fragment processor 726 or transmit burst processor 728 are read from transmit FIFO 248 at address n and n+1 to fetch 128-bits of data. Fragment processor 726 and/or transmit burst processor 728 utilizes a data aligner 734 to create the 64-bits of data for the transmit bursts. When the packet fragment is completed, control is passed to the transmit burst processor 728 and the transmit burst processor 728 notifies the modification processor 718 that the fragment buffer of fragment format RAM 720 associated with the packet buffer ID is available. Transmit burst processor 728 is then responsible for transmitting the control information 1518 of the modified egress data packet 1502 to parser 230.

In an embodiment of a system for assembling a data packet, the system includes four memory elements and one or more processors. The first memory element, fragment CAM 722, stores a sequence number and a packet buffer ID for an incoming data packet. The second memory element, transmit work buffer 724, stores revised packet fragments. The third memory element, transmit FIFO 248, stores unrevised packet fragments. The fourth memory element, fragment format RAM 720, stores a starting address. In the embodiment, the starting address stored in fragment format RAM 720 may be the starting address of the revised packet fragment or the unrevised packet fragment. The fragment CAM 722 entry identifies portions of fragment format RAM 720 associated with the sequence number. The one or more processors may be fragment processor 726 and or transmit burst processor 728. The one or more processors are configured to create a modified data packet by combining the unrevised packet fragment and the revised packet fragment, wherein the modified data packet is associated with the sequence number and sub-channel identifier.

XI. Conclusion

Flowcharts of FIGS. 4 and 8-14, and the data flow diagram of FIG. 15, show the architecture, functionality, and operation of a possible implementation of packet addressor 112. The blocks represent modules, segments, and/or portions of hardware and/or software code. The modules, segments, and/or portions of code include one or more executable instructions for implementing the specified logical function(s). In some implementations, the functions noted in the blocks may occur in a different order than that shown in FIGS. 4 and 8-15. For example, two blocks shown in succession in any of FIGS. 4, 8-15, may be executed concurrently or the blocks may sometimes be executed in another order, depending upon the functionality involved.

It should be emphasized that the above-described embodiments of the present invention, particularly, any "preferred" embodiments, are merely possible examples of implementations, merely setting forth for a clear understanding of the principles of the invention. While various embodiments of the invention have been described, it will be apparent to those of ordinary skill in the art that many more variations, embodiments, and implementations are possible that are within the scope of this invention, without substantially departing from the spirit and principles of the invention. All such modifications are intended to be included herein within the scope of this disclosure and the present invention and protected by the following claims.

What is claimed is:

1. A system for assembling a data packet, the system comprising:
    a first memory element for storing a sequence number and a sub-channel identifier for an incoming data packet;
    a second memory element for storing one or more revised packet fragment;
    a third memory element for storing one or more unrevised packet fragment;
    a fourth memory element for storing a starting address, wherein the starting address may be the starting address of a revised packet fragment or the starting address of an unrevised packet fragment, wherein the first memory element identifies portions of the fourth memory element associated with the sequence number; and
    one or more processors, wherein the one or more processors are configured to create a modified data packet by combining the one or more unrevised packet fragments and the one or more revised packet fragments, wherein the modified data packet is associated with the sequence number and the sub-channel identifier.

2. The system for assembling a data packet of claim 1, wherein the one or more processors create the modified data packet from 64-bit bursts.

3. The system for assembling a data packet of claim 1, wherein the one or more unrevised packet fragments are 64-bit words unaligned.

4. The system for assembling a data packet of claim 1, wherein the one or more revised packet fragments are 64-bit words aligned.

5. The system for assembling a data packet of claim 1, wherein the incoming data packet is a datagram.

6. The system for assembling a data packet of claim 1, wherein entries in the fourth memory element are organized as a bit validity field, a size of data field, and a location of data field.

7. A method for assembling a data packet, the method comprising steps of:
    storing a sequence number and a sub-channel identifier for an incoming data packet in a first memory element;
    storing one or more revised packet fragment;
    storing one or more unrevised packet fragment;
    storing a starting address in a second memory element, wherein the starting address may be the starting address of a revised packet fragment or the starting address of an unrevised packet fragment, wherein the first memory element identifies portions of the second memory element associated with the sequence number; and creating a modified data packet by combining the one or more unrevised packet fragments and the one or more revised packet fragments, wherein the modified data packet is associated with the sequence number and the sub-channel identifier.

8. The method for assembling a data packet of claim 7, wherein the step of creating a modified data packet includes creating the modified data packet from 64-bit bursts.

9. The method for assembling a data packet of claim 7, wherein the one or more unrevised packet fragments are 64-bit words unaligned.

10. The method for assembling a data packet of claim 7, wherein the one or more revised packet fragments are 64-bit words aligned.

11. The method for assembling a data packet of claim 7, wherein the incoming data packet is a datagram.

12. The method for assembling a data packet of claim 7, wherein entries in the second memory element are organized as a bit validity field, a size of data field, and a location of data field.

13. A system for assembling a data packet, the system comprising:

means for storing a sequence number and a sub-channel identifier for an incoming data packet in a first memory element;

means for storing one or more revised packet fragment;

means for storing one or more unrevised packet fragment;

means for storing a starting address in a second memory element, wherein the starting address may be the starting address of a revised packet fragment or the starting address of an unrevised packet fragment, wherein the first memory element identifies portions of the second memory element associated with the sequence number; and means for creating a modified data packet by combining the one or more unrevised packet fragments and the one or more revised packet fragments, wherein the modified data packet is associated with the sequence number and the sub-channel identifier.

14. The system for assembling a data packet of claim 13, wherein the means for creating a modified data packet includes means for creating the modified data packet from 64-bit bursts.

15. The system for assembling a data packet of claim 13, wherein the one or more unrevised packet fragments are 64-bit words unaligned.

16. The system for assembling a data packet of claim 13, wherein the one or more revised packet fragments are 64-bit words aligned.

17. The system for assembling a data packet of claim 13, wherein the incoming data packet is a datagram.

18. The system for assembling a data packet of claim 13, wherein entries in the second memory element are organized as a bit validity field, a size of data field, and a location of data field.

* * * * *